(12) United States Patent
Fujii et al.

(10) Patent No.: US 10,919,154 B2
(45) Date of Patent: Feb. 16, 2021

(54) INTERFERENCE DETERMINATION METHOD, INTERFERENCE DETERMINATION SYSTEM, AND COMPUTER PROGRAM

(71) Applicant: OMRON Corporation, Kyoto (JP)

(72) Inventors: Haruka Fujii, Uji (JP); Akane Nakashima, Nara (JP); Takeshi Kojima, Kyoto (JP); Kennosuke Hayashi, Kizugawa (JP)

(73) Assignee: OMRON Corporation, Kyoto (JP)

( * ) Notice: Subject to any disclaimer, the term of this patent is extended or adjusted under 35 U.S.C. 154(b) by 400 days.

(21) Appl. No.: 16/136,995

(22) Filed: Sep. 20, 2018

(65) Prior Publication Data
US 2019/0134815 A1    May 9, 2019

(30) Foreign Application Priority Data

Nov. 9, 2017    (JP) .............................. JP2017-216385

(51) Int. Cl.
*B25J 9/16*    (2006.01)

(52) U.S. Cl.
CPC ........... *B25J 9/1666* (2013.01); *B25J 9/1607* (2013.01)

(58) Field of Classification Search
CPC ....... B25J 9/00; B25J 9/003; B25J 9/16; B25J 9/1602; B25J 9/1605; B25J 9/1607; B25J 9/1656; B25J 9/1664; B25J 9/1666; B25J 9/1674; B25J 9/1676; B25J 19/06; G05B 19/406; G05B 19/4061; G05B 2219/00
See application file for complete search history.

(56) References Cited

U.S. PATENT DOCUMENTS

| | | | |
|---|---|---|---|
| 4,888,707 A | 12/1989 | Shimada | |
| 2006/0176001 A1 | 8/2006 | Haunerdinger | |
| 2012/0265342 A1 | 10/2012 | Kumiya et al. | |
| 2015/0269770 A1* | 9/2015 | Jenkins | G06T 15/40 345/421 |
| 2019/0039242 A1* | 2/2019 | Fujii | B25J 9/1666 700/255 |

FOREIGN PATENT DOCUMENTS

| | | |
|---|---|---|
| EP | 0412619 A2 | 2/1991 |
| JP | 2012-223845 A | 11/2012 |

OTHER PUBLICATIONS

Extended European search report dated May 14, 2019 in a counterpart European patent application.

* cited by examiner

*Primary Examiner* — Khoi H Tran
*Assistant Examiner* — Sarah A Tran
(74) *Attorney, Agent, or Firm* — Metrolex IP Law Group, PLLC

(57) ABSTRACT

An interference determination method is provided to compute whether or not a robot that operates according to a motion path will interfere with a nearby object. A first orientation, a second orientation, and an intermediate orientation of the robot are set, and a first combined approximated body is generated that is configured by combining a plurality of robot approximated bodies, which are obtained by approximating the shape of the robot in these orientations. If it is determined that the robot will interfere with the nearby object, whether to generate a combined approximated body that is smaller than the first combined approximated body is determined based on the amount indicating the interval between two adjacent robot approximated bodies.

9 Claims, 23 Drawing Sheets

FIRST COMBINED APPROXIMATED BODY

INTERFERENCE DETERMINATION METHOD, INTERFERENCE DETERMINATION SYSTEM, AND COMPUTER PROGRAM

CROSS-REFERENCES TO RELATED APPLICATIONS

This application claims priority to Japanese Patent Application No. 2017-216385 filed Nov. 9, 2017, the entire contents of which are incorporated herein by reference.

FIELD

The disclosure relates to an interference determination method, an interference determination system, and a computer program.

BACKGROUND

When an industrial robot is made to perform a specific task, a lot of time and effort are required to determine a motion path for a robot arm that carries out the task by means of programming or teaching to actually operate a real machine.

In contrast, if an algorithm can be used that automatically generates a path from an operation start point (starting point) to an operation end point (ending point) upon receiving input of the starting point and the ending point, it is expected that the time taken to teach the industrial robot will be significantly shortened.

JP 2012-223845A discloses a method for checking whether or not a robot arm of an industrial robot will interfere with a nearby object, when the operation of the robot arm is to be controlled. JP 2012-223845A discloses an interference prediction method in which a path for the robot that connects a starting point to an end point is segmented at discrete time points at which the robot passes along the path, the area occupied by the robot in the respective path segments is calculated, the occupied areas at adjacent discrete time points are combined to calculate a plurality of convex hulls, it is calculated whether or not each of these convex hulls and a convex polyhedron, which is obtained by approximating a nearby obstacle using a polyhedron, share an area, and, if there is any shared area, it is determined that interference occurs.

When a path is generated using such an algorithm, it is favorable that a path can be generated while giving consideration to a nearby environment in which the industrial robot is placed, e.g. obstacles such as a belt conveyor, making it possible to generate a path that fits better to the actual environment.

JP 2012-223845A is an example of background art.

High-speed path computation processing is one of the performance capabilities required for such automatic path generation. For example, if a plurality of items to be gripped that are irregularly conveyed on a belt conveyor need to be gripped with a robot arm, paths need to be calculated for the respective items to be gripped, and thus the computation processing speed needs to be increased. This is because the length of computation time directly affects the speed at which the belt conveyor can move, as well as production efficiency.

In the interference determination method described in JP 2012-223845A, whether or not there is any shared area is determined for all of the convex hulls obtained by combining the occupied areas of the robot at adjacent discrete time points and a convex polyhedron obtained by approximating an obstacle near the robot. For this reason, it takes time to determine whether or not interference occurs.

One or more aspects may provide an interference determination method, an interference determination system, and a computer program that make it possible to compute, at high speed, whether or not a robot that operates according to a motion path will interfere with a nearby object.

SUMMARY

An interference determination method according to an aspect of this disclosure is a method for determining, using a computing device including an acquisition unit, a storage unit, and a computing unit, a possibility that a robot having a plurality of movable shafts interferes with a nearby object that is present near the robot, on a motion path through which the robot moves from an initial orientation to a target orientation. The computing unit performs: a step of causing the storage unit to store robot data obtained by approximating, using a polyhedron, a shape of a specific portion of interest of the robot; a step of causing the storage unit to store data of a nearby object approximated body obtained by approximating a shape of the nearby object; a step of acquiring, using the acquisition unit, the initial orientation and the target orientation; a step of setting a first orientation of the robot on the motion path through which the robot moves from the initial orientation to the target orientation, a second orientation of the robot on the motion path, the second orientation being set relatively closer to the target orientation than the first orientation, and an intermediate orientation between the first orientation and the second orientation; a step of generating, based on the robot data, a plurality of robot approximated bodies obtained by approximating, using polyhedrons, a shape of at least one portion of interest of the robot in the first orientation, the second orientation, and the intermediate orientation; a step of generating a first combined approximated body configured by combining the robot approximated bodies generated in the previous step; a step of determining whether or not the first combined approximated body interferes with the nearby object approximated body; if it is determined in this step that interference occurs, a step of calculating an amount indicating an interval between two adjacent robot approximated bodies, of the plurality of robot approximated bodies constituting the first combined approximated body, and comparing the calculated amount with a specific value; and a step of determining whether or not to generate a combined approximated body that is smaller than the first combined approximated body, based on a result of comparing the amount indicating the interval and the specific value.

According to an aspect, the amount indicating the interval between two adjacent robot approximated bodies that constitute the first combined approximated body is calculated, and is compared with the specific value. Thus, it is possible to determine whether or not the interference determination has been performed with a sufficiently narrow interval, and to change subsequent processing in accordance with the comparison result. That is to say, if the interval between two adjacent robot approximated bodies is relatively wide, there is a possibility that an obstacle is present between these robot approximated bodies. For this reason, subsequent processing is changed depending on whether the interval is greater than or equal to the specific value, or smaller than the specific value, and thus, accurate interference determination is enabled while omitting unnecessary interference determination processing to keep high processing speed.

If it is determined that the amount indicating the interval is greater than or equal to the specific value, the computing unit may further perform: a step of generating a second combined approximated body configured by combining at least two of the plurality of robot approximated bodies corresponding to the portion of interest in the first orientation, the second orientation, and the intermediate orientation, the second combined approximated body being smaller than the first combined approximated body; and a step of determining whether or not the second combined approximated body interferes with the nearby object approximated body.

According to an aspect, the second combined approximated body that is smaller than the first combined approximated body is generated, and whether or not the second combined approximated body interferes with the nearby object approximated body is determined. If it is determined that interference does not occur, interference determination processing for this area can be omitted, and thus, high-speed interference determination processing can be realized.

If, in the step of determining whether or not the second combined approximated body interferes with the nearby object approximated body, it is determined that interference occurs, and if an amount indicating an interval between two adjacent robot approximated bodies, of the plurality of robot approximated bodies constituting the second combined approximated body, is greater than or equal to the specific value, the computing unit may further perform: a step of generating an nth combined approximated body configured by combining at least two of the plurality of robot approximated bodies corresponding to the first orientation, the second orientation, and the intermediate orientation, the nth combined approximated body being smaller than a (n−1)th combined approximated body; and a step of determining whether or not the nth combined approximated body interferes with the nearby object approximated body.

According to an aspect, if the amount indicating the interval between the two adjacent robot approximated bodies is greater than or equal to the specific value, an (n+1)th combined approximated body that is smaller than the nth combined approximated body is generated. For this reason, if the interval is not sufficiently narrow, more detailed interference determination can be further performed using the smaller (n+1) combined approximated body, whereas, if the interval is sufficiently narrow, subsequent interference determination processing can also be omitted. Accordingly, high-speed interference determination processing can be realized.

The computing unit may repeat the step of generating the nth combined approximated body and the step of determining whether or not the nth combined approximated body interferes with the nearby object approximated body, while incrementing n by 1 at a time until an amount indicating an interval between two adjacent robot approximated bodies, of the plurality of robot approximated bodies constituting the nth combined approximated body, becomes smaller than the first specific value.

According to an aspect, the step of generating the nth combined approximated body while incrementing n by 1 at a time until the amount indicating the interval becomes smaller than the specific value and the step of determining whether or not the nth combined approximated body interferes with the nearby object approximated body are repeated. Accordingly, it is possible to perform detailed interference determination as needed, and also omit unnecessary interference determination processing.

Also, if the amount indicating the interval between the two adjacent robot approximated bodies that constitute the nth combined approximated body is smaller than the specific value, the computing unit can output a message that there is a possible of interference on the motion path between the two adjacent robot approximated bodies that constitute the nth combined approximated body.

According to an aspect, if the interval is sufficiently narrow and there is a possibility of interference, similar interference determination processing can be ended. Accordingly, the accuracy of interference determination can be increased while omitting unnecessary interference determination processing to keep high processing speed.

Also, the step of generating the nth approximated body can include a step of combining an intermediate orientation on a motion path between two adjacent robot approximated bodies, of the plurality of robot approximated bodies that constitute the (n−1)th combined approximated body, with the two adjacent robot approximated bodies to generate the nth combined approximated body.

According to an aspect, the nth combined approximated body is generated by combining the intermediate orientation on the motion path between the two adjacent robot approximated bodies, with the two adjacent robot approximated bodies. Thus, detailed interference determination using the intermediate orientation on the motion path between the two adjacent robot approximated bodies can be performed.

The step of determining whether or not a kth combined approximated body (k is an integer that is 1 or greater) interferes with the nearby object approximated body can include: a step of calculating a distance between the nearby object approximated body and the kth combined approximated body; and a step of comparing the distance with a second specific value.

According to an aspect, the possibility of interference can be determined based on the distance between the nearby object approximated body and the kth combined approximated body. Accordingly, even in a case where an intermediate orientation is assumed in which the robot protrudes from the kth combined approximated body due to a rotational motion of the drive shafts, interference determination can be performed while giving consideration to such an intermediate orientation.

In an interference determination method according to another aspect of this disclosure, a possibility that a robot having a plurality of movable shafts interferes with a nearby object that is present near the robot, on a motion path through which the robot moves from an initial orientation to a target orientation, is calculated using a computing device including a computing unit. The computing unit performs: a step of setting rotation angles of the plurality of movable shafts for specifying a first orientation of the robot on the motion path through which the robot moves from the initial orientation to the target orientation; a step of setting rotation angles of the plurality of movable shafts for specifying a second orientation of the robot on the motion path, the second orientation being closer to the target orientation than the first orientation, wherein the rotation angle of each of the movable shafts formed while the robot is changing from the first orientation to the second orientation increases or decreases monotonously; a step of setting information indicating rotation angles of the plurality of movable shafts to specify at least one intermediate orientation between the first orientation and the second orientation; a step of generating a plurality of robot approximated bodies obtained by approximating, using a polyhedron, at least one portion of interest of the robot, corresponding to the first orientation, the second orientation, and the intermediate orientation; a step of determining whether or not a first combined approximated body configured by combining the plurality of robot approximated bodies generated in the previous step interferes with the nearby object; a step of generating, if it is determined in the previous step that interference occurs, a second combined approximated body configured by combining the plurality of robot approximated bodies, the second combined approximated body being smaller than the first combined approximated body; and a step of determining whether or not the second combined approximated body interferes with the nearby object approximated body.

According to an aspect, the rotation angles of the movable shafts change in a monotonously-increasing or decreasing manner while the robot is moving from the first orientation to the second orientation, and thus the rotation angle of any specific movable shaft does not both increase and decrease, and interference determination can be performed more correctly. If it is determined that the first combined approximated body interferes with the nearby object, the second combined approximated body that is smaller than the first combined approximated body is generated to perform interference determination. Thus, high-speed interference determination can be realized without generating the second combined approximated body, if not needed.

In an interference determination method according to another aspect of this disclosure, the possibility that a robot having a plurality of movable shafts interferes with a nearby object that is present near the robot, on a motion path through which the robot moves from a first orientation to a second orientation is determined using a computing device including a computing unit.

This method includes steps including: a step of acquiring the first orientation of the robot on the motion path; a step of acquiring the second orientation of the robot on the motion path; a step of determining, with a first resolution, whether or not a specific portion of the robot interferes with a nearby object, regarding the motion path from the first orientation to the second orientation; a step of determining, with a second resolution that is higher than the first resolution, whether or not the specific portion of the robot interferes with the nearby object, only regarding a second motion path, which is a portion of a motion path that is selected based on a result of the previous step; and a step of determining, with a third resolution that is higher than the second resolution, whether or not the specific portion of the robot interferes with the nearby object, only regarding a third motion path, which is a portion of the second motion path that is selected based on a result of the previous step.

According to an aspect, whether or not the specific portion of the robot interferes with the nearby object is determined with the first resolution regarding the motion path from the first orientation to the second orientation. Then, whether or not the specific portion of the robot interferes with the nearby object is determined with the second resolution, only regarding the second motion path that is selected based on the result of the determination with the first resolution. Furthermore, whether or not the specific portion of the robot interferes with the nearby object is determined with the third resolution, only regarding the third motion path that is selected based on the result of the determination with the second determination. Accordingly, when interference determination is performed with at least three levels of resolution, interference determination can be performed with a higher resolution for a portion of the motion path that is dynamically selected based on the result of interference determination performed with a lower resolution, and high-speed interference determination processing can be realized.

An interference determination system according to another aspect of this disclosure determines, using a computing device including an acquisition unit, a storage unit, and a computing unit, a possibility that a robot having a plurality of movable shafts interferes with a nearby object that is present near the robot, on a motion path through which the robot moves from an initial orientation to a target orientation. The computing unit is configured to perform: a step of causing the storage unit to store robot data obtained by approximating, using a polyhedron, a shape of a specific portion of interest of the robot; a step of causing the storage unit to store data of a nearby object approximated body obtained by approximating a shape of the nearby object; a step of acquiring, using the acquisition unit, the initial orientation and the target orientation; a step of setting a first orientation of the robot on the motion path through which the robot moves from the initial orientation to the target orientation, a second orientation of the robot on the motion path, the second orientation being set relatively closer to the target orientation than the first orientation, and an intermediate orientation between the first orientation and the second orientation; a step of generating, based on the robot data, a plurality of robot approximated bodies obtained by approximating, using polyhedrons, a shape of at least one portion of interest of the robot in the first orientation, the second orientation, and the intermediate orientation; a step of generating a first combined approximated body configured by combining the plurality of robot approximated bodies generated in the previous step; a step of determining whether or not the first combined approximated body interferes with the nearby object approximated body; if it is determined in this step that interference occurs, a step of calculating an amount indicating an interval between two adjacent robot approximated bodies, of the plurality of robot approximated bodies constituting the first combined approximated body, and comparing the calculated amount with a first specific value; and a step of determining whether or not to generate a combined approximated body that is smaller than the first combined approximated body, based on a result of comparing the amount indicating the interval and the first specific value.

According to an aspect, the amount indicating the interval between two adjacent robot approximated bodies that constitute the first combined approximated body is calculated and compared with the specific value. Thus, it is possible to determine whether or not the interference determination is currently performed with a sufficiently narrow interval, and to change subsequent processing in accordance with the comparison result. That is to say, if the interval between the two adjacent robot approximated bodies is relatively wide, there is a possibility that an obstacle is present between these robot approximated bodies. For this reason, subsequent processing is changed in accordance with whether the interval is greater than or equal to the specific value, or is smaller than the specific value. Thus, accurate interference determination can be performed while omitting unnecessary interference determination processing to keep high processing speed.

A program according to another aspect of this disclosure causes a computing device including an acquisition unit, a storage unit, and a computing unit to perform interference determination to determine a possibility that a robot having a plurality of movable shafts interferes with a nearby object that is present near the robot, on a motion path through which the robot moves from an initial orientation to a target orientation. The computing unit is caused to perform: a step of causing the storage unit to store robot data obtained by approximating, using a polyhedron, a shape of a specific portion of interest of the robot; a step of causing the storage unit to store data of a nearby object approximated body obtained by approximating a shape of the nearby object; a step of acquiring, using the acquisition unit, the initial orientation and the target orientation; a step of setting a first orientation of the robot on the motion path through which the robot moves from the initial orientation to the target orientation, a second orientation of the robot on the motion path, the second orientation being set relatively closer to the target orientation than the first orientation, and an intermediate orientation between the first orientation and the second orientation; a step of generating, based on the robot data, a plurality of robot approximated bodies obtained by approximating, using polyhedrons, a shape of at least one portion of interest of the robot in the first orientation, the second orientation, and the intermediate orientation; a step of generating a first combined approximated body configured by combining the plurality of robot approximated bodies generated in the previous step; a step of determining whether or not the first combined approximated body interferes with the nearby object approximated body; if it is determined in this step that interference occurs, a step of calculating an amount indicating an interval between two adjacent robot approximated bodies, of the plurality of robot approximated bodies constituting the first combined approximated body, and comparing the calculated amount with a first specific value; and a step of determining whether or not to generate a combined approximated body that is smaller than the first combined approximated body, based on a result of comparing the amount indicating the interval and the first specific value.

According to an aspect, the amount indicating the interval between the two adjacent robot approximated bodies that constitute the first combined approximated body is calculated and compared with the specific value. Thus, it is possible to determine whether or not the interference determination is currently performed with a sufficiently narrow interval, and to change subsequent processing in accordance with the comparison result. That is to say, if the interval between the two adjacent robot approximated bodies is relatively wide, there is a possibility that an obstacle is present between these robot approximated bodies. For this reason, subsequent processing is changed in accordance with whether the interval is greater than or equal to the specific value, or is smaller than the specific value. Thus, accurate interference determination can be performed while omitting unnecessary interference determination processing to keep high processing speed.

Note that the "initial orientation" includes an orientation of the robot when starting an operation, and includes, for example, an orientation that is assumed by the robot at a starting point when a motion path of the robot is computed.

The "target orientation" includes an orientation of the robot when ending an operation, and includes, for example, an orientation that is assumed by the robot at an ending point when a motion path of the robot is computed.

The "portion of interest" refers to part of or the entire model data of the shape of the robot that is expressed using a mesh pattern or the like, and includes a shape that is approximated using an approximation method such as a method using an OBB (Oriented Bounding Box) or the like. For example, each link of an industrial robot, or a portion of a link may be handled as the portion of interest.

The "robot data" includes data indicating the shape of the robot that is obtained by approximating the model data of the shape of the robot expressed using a mesh pattern or the like, using a specific approximation method.

The "nearby object approximated body" includes a shape model obtained by approximating a nearby object, such as an obstacle, using an approximation method such as a method using a mesh pattern, an AABB (Axis-Aligned Bounding Box), or the like.

The "first orientation" refers to an orientation on the motion path that connects the initial orientation to the target orientation, and includes an orientation for which a robot approximated body is to be generated. The first orientation may be the same as the initial orientation.

The "second orientation" refers to an orientation on the motion path that connects the initial orientation to the target orientation, and includes an orientation for which a robot approximated body is to be generated. The second orientation may be the same as the target orientation.

The "intermediate orientation" is an orientation on the motion path between the first orientation and the second orientation, and includes an orientation for which a robot approximated body is to be generated. The intermediate orientation is not limited to an orientation at an intermediate position on the motion path between the first orientation and the second orientation.

The "robot approximated body" includes an approximated body that is calculated based on the robot data and is obtained by approximating an orientation of the robot (a posture of the robot with joints of respective shafts defined by specific values) corresponding to each of the first orientation, the second orientation, and the intermediate orientation, using an approximation method such as a method using an OBB or the like.

The "combined approximated body" includes an approximated body obtained by combining at least two robot approximated bodies. The "combined approximated body" includes an approximated body obtained by approximating the at least two robot approximated bodies so as to include most or all of them, using an approximation method such as a method using an AABB or the like.

One or more aspects can provide an interference determination method, an interference determination system, and a computer program that make it possible to compute, at high speed, whether or not a robot that operates according to a motion path will interfere with a nearby object.

DETAILED DESCRIPTION

First Embodiment

First, a description will be given, using FIG. 1, of an example of an embodiment.

Figure 1:
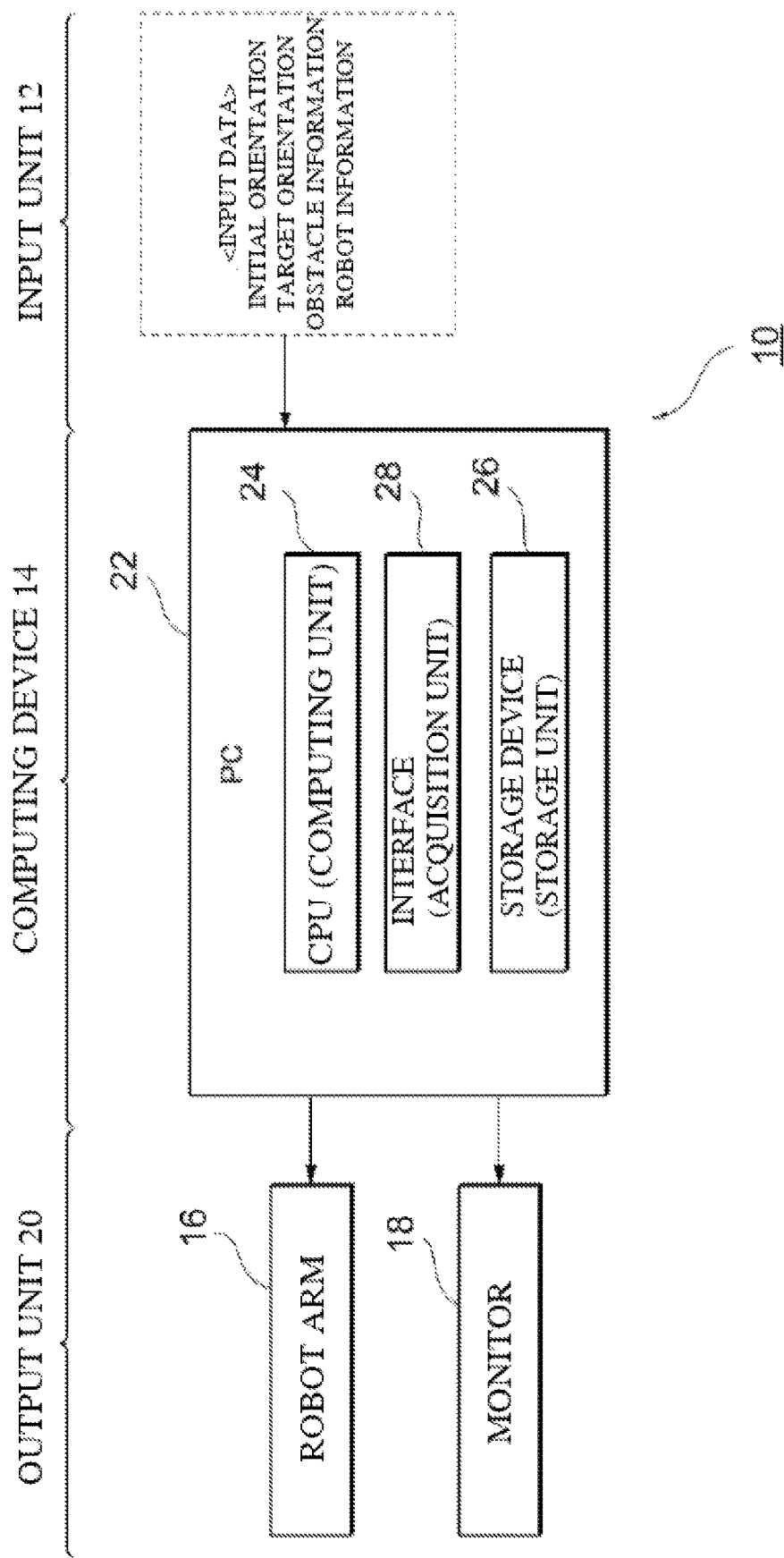
FIG. 1 is a hardware block diagram illustrating an interference determination system according to first and second embodiments.

FIG. 1 is a hardware block diagram of an interference determination system 10 (an example of an "interference determination system") according to a first embodiment. As shown in this diagram, the interference determination system 10 includes an input unit 12 for inputting information, a computing device 14 (an example of a "computing device") for processing information, a robot arm 16 (an example of a "robot") that is controlled based on computing results, and an output unit 20 that includes a monitor 18 for displaying the results.

The input unit 12 functions as an interface for inputting information to the computing device 14, and includes a means for inputting input data that includes an initial orientation and a target orientation of the robot arm 16, obstacle information, robot information regarding the robot arm 16, and the like.

The computing device 14, which can typically be realized using a computer 22, includes an interface 28 (an example of an "acquisition unit") for acquiring information that is input from the input unit 12 or the like, a CPU 24 (an example of a "computing unit") for performing various kinds of computation processing in an embodiment, and a storage device 26 (an example of a "storage unit") for storing programs or the like that define processing such as that of interference determination in an embodiment, in a nonvolatile manner.

An interference determination method for determining the possibility that the robot arm 16 will interfere with a nearby object, such as an obstacle, is realized using the interference determination system 10 according to an embodiment, through the following steps.

First, the interface 28 acquires the initial orientation and target orientation that are input from the input unit 12. Specifically, the interface 28 acquires rotational angles of respective drive shafts that specify the orientation of the robot arm 16. The initial orientation and the target orientation may also be given as an initial position and a target position that include information regarding the positions of a leading end of the robot arm 16. At this time, the rotation angles of the respective drive shafts are calculated by a specific computing device, which includes the CPU 24 (computing unit) of the computing device 14, performing an inverse kinematics calculation based on the leading end positions. The initial orientation may also be current rotation angles of the respective drive shafts of the robot arm 16, for example. The target orientation or the target position may be calculated based on an image that shows the position of an item subjected to a task carried out by the robot arm 16, for example.

Next, the CPU 24 sets a first orientation and a second orientation on a motion path from the initial orientation to the target orientation. Specifically, the CPU 24 sets the rotational angles of the respective drive shafts that specify the orientation of the robot arm 16.

Here, the first orientation and the second orientation are set so that the rotation angle of each movable shaft increases or decreases monotonously while the robot arm 16 changes from the first orientation to the second orientation. For example, one movable shaft monotonously increases from the rotation angle in the first orientation to the rotation angle in the second orientation. Another movable shaft decreases monotonously from the rotation angle in the first orientation to the rotation angle in the second orientation. By thus setting the first orientation and the second orientation, and determining the possibility of interference between a later-described first rectangular parallelepiped that includes the first orientation and the second orientation and a nearby object, it is possible to determine, at high speed, whether or not there is a possibility of interference between the robot arm 16 and the nearby object when the robot arm 16 moves from the first orientation to the second orientation. That is to say, if the rotation angle of a movable shaft repeatedly increases and decreases, the motion of the robot arm 16 forms a trajectory that extends back and forth. Meanwhile, if the rotation angle of a movable shaft increases or decreases monotonously, the motion of the robot arm 16 forms substantially an arc trajectory. For this reason, if it is determined for such a trajectory whether or not interference will occur, the possibility of interference can be determined at high speed. On the other hand, if the rotation angle of a movable shaft increases and decreases while changing from the rotation angle in the first orientation to the rotation angle in the second orientation, there is a possibility that an intermediate orientation significantly protrudes from a first rectangular parallelepiped that includes these two orientations. Then, it cannot be ensured that there is no possibility of interference with a nearby object, which is not favorable.

Next, an intermediate orientation is set. The intermediate orientation refers to an orientation on the motion path from the first orientation to the second orientation, and can be set by, for example, calculating average values of the rotation angles of the respective drive shafts corresponding to the first orientation and the rotation angles of the respective drive shafts corresponding to the second orientation, and applying the calculated average values to forward kinematics.

Thereafter, robot approximated bodies (each of which is an example of a "robot approximated body") are generated, which are obtained by approximating each link (an example of a "portion of interest") in the first orientation, the second orientation, and the intermediate orientation, using later-described second rectangular parallelepipeds.

Then, a first combined approximated body (an example of a "first combined approximated body") is generated, which is obtained by combining the robot approximated bodies in the first orientation, the intermediate orientation, and the second orientation, and approximating the combined robot approximated bodies using a first rectangular parallelepiped. At this time, it is favorable that the first combined approximated body is a rectangular parallelepiped that includes the robot approximated bodies in the first orientation, the intermediate orientation, and the second orientation.

Next, the possibility of interference between the first combined approximated body and a nearby object approximated body (an example of a "nearby object approximated body") is determined, the nearby object approximated body being obtained by approximating a nearby object using a first rectangular parallelepiped.

If the result of this determination indicates that there is no possibility of interference therebetween, it can be determined that the robot arm 16 will not interfere the nearby object when moving from the first orientation to the second orientation, and it can be thus determined that no detailed interference determination is required for the motion path between the first orientation and the second orientation. For this reason, the CPU 24 sets the second orientation as a new first orientation, newly sets a second orientation, and repeats the same processing. Thus, the CPU 24 can determine the possibility of interference between the robot arm 16 and nearby objects for the overall motion path from the initial orientation to the target orientation.

On the other hand, if there is a possibility of interference therebetween, next, the necessity for detailed interference determination is determined.

That is to say, if it is determined that there is a possibility of interference therebetween in a case where the first orientation is sufficiently close to the second orientation, and accordingly the resolution is sufficient, it is conceivable that interference between the robot arm 16 and the nearby object is highly likely to actually occur. For this reason, it can be determined that no more robot approximated bodies need to be newly generated to continue more detailed interference determination. The CPU 24 determines that the robot arm 16 is highly likely to interfere with the nearby object when moving from the first orientation to the second orientation, and the interference determination method according to an embodiment ends. Then, it may be accurately determined whether or not interference will occur, using another method that requires complexity, or another path may also be searched, as needed.

In contrast, if the resolution is insufficient, and the first orientation and the second orientation are spaced widely apart, that is, the interval between the first orientation and the second orientation is greater than or equal to a specific value, a second combined approximated body (an example of a "second combined approximated body") obtained by approximating the first orientation and the intermediate orientation using a first rectangular parallelepiped, and a second combined approximated body (an example of a "second combined approximated body") obtained by approximating the intermediate orientation and the second orientation, are generated, and the possibility of interference between each of these second combined approximated bodies and the nearby object approximated body is determined similarly. That is to say, second combined approximated bodies that are smaller than the first combined approximated body are generated, and the possibility of interference between each of the second combined approximated bodies and the nearby object approximated body is determined. The following description will focus on the second combined approximated body that includes the intermediate orientation and the second orientation.

If the result of this determination indicates that there is no possibility of interference between the second combined approximated body, which includes the intermediate orientation and the second orientation, and the nearby object approximated body, it can be determined that the robot arm 16 will not interfere with the nearby object when moving from the intermediate orientation to the second orientation. It can be thus determined that no detailed interference determination is needed for the motion path between the intermediate orientation to the second orientation.

On the other hand, if there is a possibility of interference therebetween, the necessity for detailed interference determination is determined.

If the intermediate orientation and the second orientation is sufficient close to each other and the resolution is sufficient, it is conceivable that the robot arm 16 is highly likely to actually interfere with the nearby object. It can therefore be determined that no more detailed interference determination is needed. Accordingly, a message is output to indicate that there is a possibility that the second combined approximated body that includes the intermediate orientation and the second orientation will interfere with the nearby object.

In contrast, if the resolution is insufficient, and the intermediate orientation and the second orientation are spaced widely apart, another new intermediate orientation is set between the intermediate orientation and the second orientation, and a third combined approximated body obtained by combining the original intermediate orientation with the new intermediate orientation and approximating the combined orientations using a first rectangular parallelepiped, and a third combined approximated body obtained by combining the new intermediate orientation with the second orientation and approximating the combined orientations using a first rectangular parallelepiped, are generated. Then, determination is performed regarding interference between each of these third combined approximated bodies and the nearby object. Similarly, if the resolution is insufficient when it was determined that there is a possibility of interference, generation of fourth and subsequent combined approximated bodies and determination regarding the possibility of interference using these combined approximated bodies are repeated until a specific resolution is reached.

In the above-described interference determination method, subsequent detailed interference determination is omitted for a motion path for which it is determined that there is no possibility of interference with a nearby object, whereas detailed interference determination is repeated for a motion path for which it is determined that there is a possibility of interference, while generating intermediate orientations until a specific resolution is reached. Accordingly, it is possible to achieve both high-speed interference determination processing and detailed specification of a motion path with which there is a possibility of interference.

The "first rectangular parallelepiped" refers to a rectangular parallelepiped that is constituted by lines parallel to respective axes of a predetermined reference coordinate system (e.g. an absolute coordinate system with X, Y, and Z axes that are perpendicular to one another, where the X and Y axes are defined as horizontal directions and the Z axis is defined as a vertical direction), the rectangular parallelepiped including an object that is to be approximated. The origin of the predetermined reference coordinate system can be provided in a surface with which a later-described base link BL is in contact.

The "second rectangular parallelepiped" refers to a rectangular parallelepiped that is constituted by lines parallel to axes of a second perpendicular coordinate system, which is inclined by a predetermined angle relative to the predetermined reference coordinate system, the rectangular parallelepiped including an object to be approximated.

In an embodiment, a robot approximated body is generated for each link, which serves as a portion of interest, to perform interference determination, but this may not always be the case. A robot approximated body may also be generated only for some links (e.g. a link at an end of the hand or an end effector that is highly likely to interfere) to perform interference determination.

Alternatively, a robot approximated body may also be generated for a portion of interest other than links (e.g. an item itself that is to be gripped by the end effector, or a portion including the end effector and the item that is to be gripped thereby), or for some links to perform interference determination.

Also, the order of the steps in the embodiments in this disclosure may also be changed without departing from the gist of the invention, by a person skilled in the art exercising ordinary creativity. For example, a plurality of intermediate orientations may be set at the same time as the first orientation and second orientation. However, the processing speed can be further increased by setting an intermediate orientation on a motion path only when needed (e.g. when there is a possibility of interference).

Various approximation methods are available. An object may be approximated using a bounding volume that includes a target object by means of, for example, a first rectangular parallelepiped or a second rectangular parallelepiped, or an object may also be approximated using a polyhedron, such as a convex hull, that does not include the object. Here, by approximating an object so as to including it using a bounding volume, it is possible to eliminate determination errors, i.e. it is possible to prevent determination that no interference will occur from being made although interference will actually occur.

Second Embodiment

A second embodiment will be described below with reference to the drawings. Note that the same elements are assigned the same signs, and redundant descriptions are omitted or simplified.

FIG. 1 is a hardware block diagram of the interference determination system 10 (an example of an "interference determination system") according to a second embodiment.

Here, the CPU 24 of the computing device 14 (an example of a "computing device") reads out programs (including programs that are illustrated in the flowcharts or the like in this disclosure and that define computation processing), which are stored in the storage device 26 (an example of a "storage unit"), or acquires programs from the outside using the interface 28 (an example of an "acquisition unit"), and executes these programs. A temporary storage device (not shown) that is included in the computing device 14 is constituted by an SRAM (Static Random Access Memory) or the like, and temporarily stores some of the programs, computation data, or the like.

The storage device 26 is a medium that stores information such as programs in a computer-readable state, in an electrical, magnetic, optical, mechanical, or chemical manner, or in combination thereof. Examples of the storage device 26 include a CD, a DVD, a magnetic disk, an MO, and a semiconductor memory (NOR flash memory, NAND flash memory, MRAM etc.).

The interface 28 is a wired or wireless communication interface for giving and receiving information to/from an external device, for example.

The input unit 12 is a device for inputting information, such as a mouse, a keyboard, a touchpad, a keypad, or a microphone.

Figure 2A:
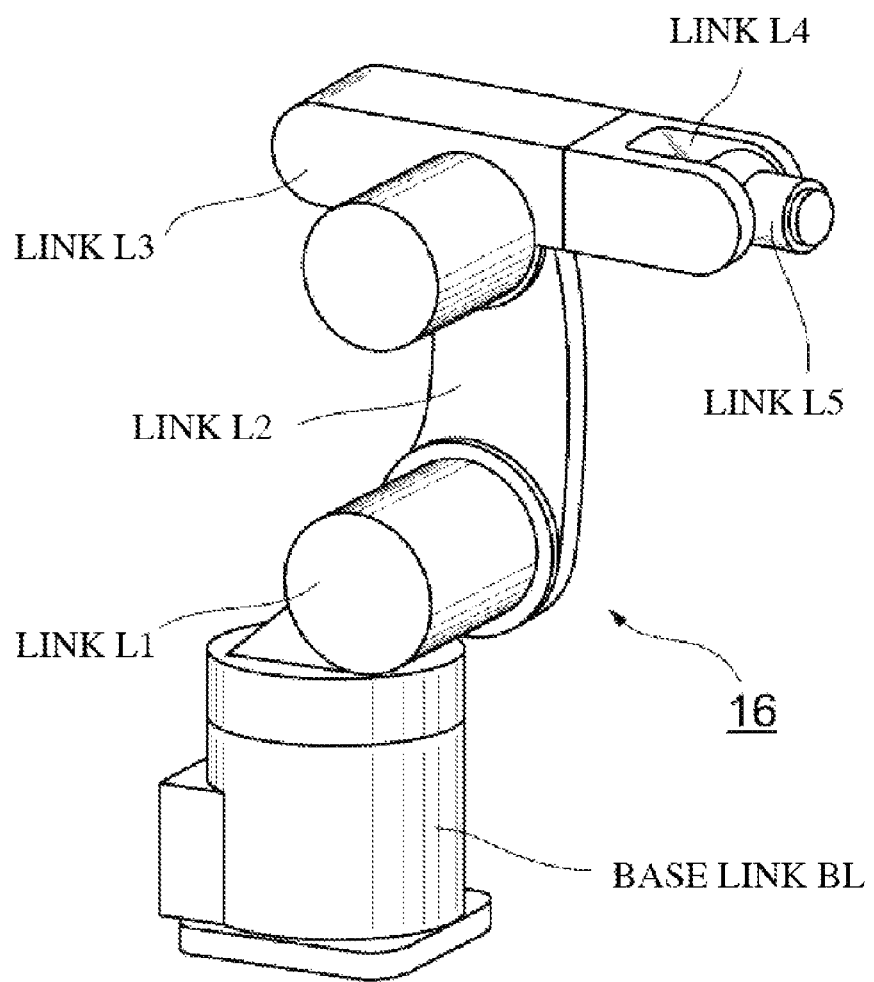
FIG. 2A and FIG. 2B are diagrams illustrating a robot arm and robot data thereof.
Figure 2B:
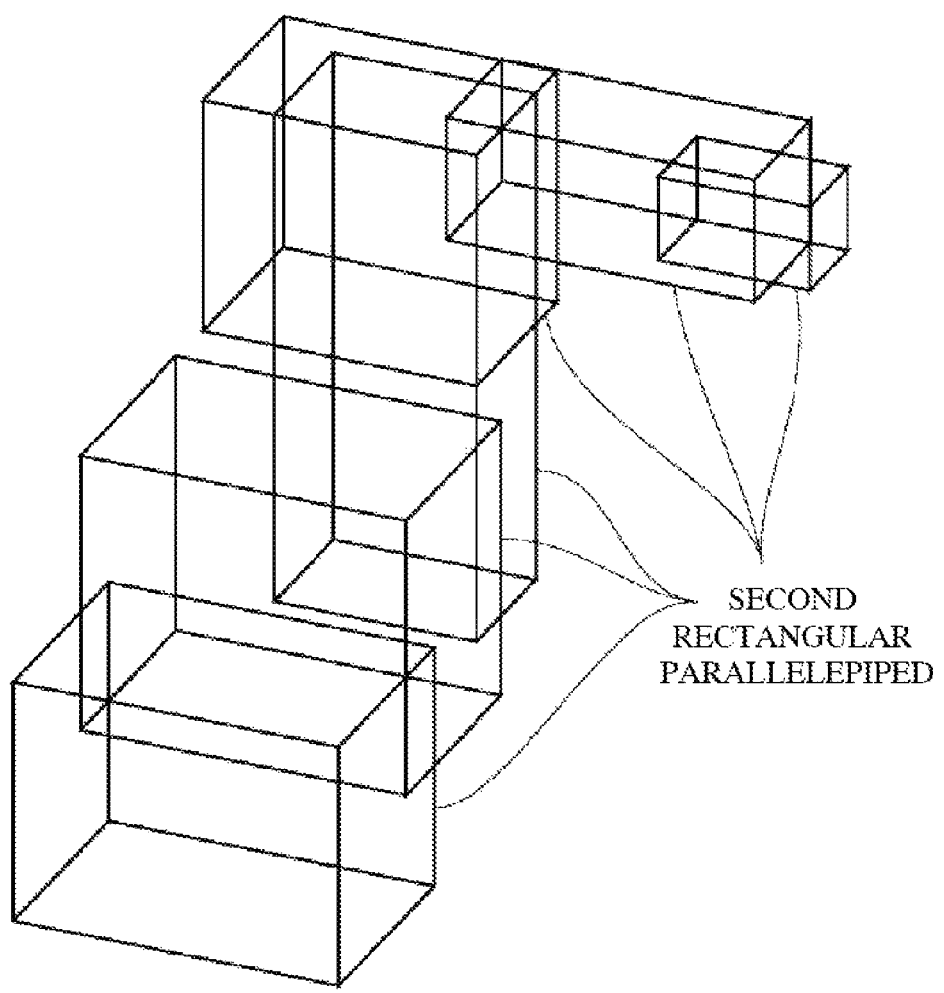

FIG. 2A shows the robot arm 16 (an example of a "robot") that is to be controlled. FIG. 2B shows robot data in which links BL to L1 (each of which is an example of a "portion of interest"), namely a plurality of links L that constitute the robot arm 16 are approximated using second rectangular parallelepipeds, based on later-described step S12.

This robot arm 16 is a six-axis vertical articulated robot arm, and the links L are driven to rotate by servomotors (not shown). An end effector is connected to a leading-end link L5.

An interference determination method using the above-described interference determination system 10 will be described below.

Figure 3:
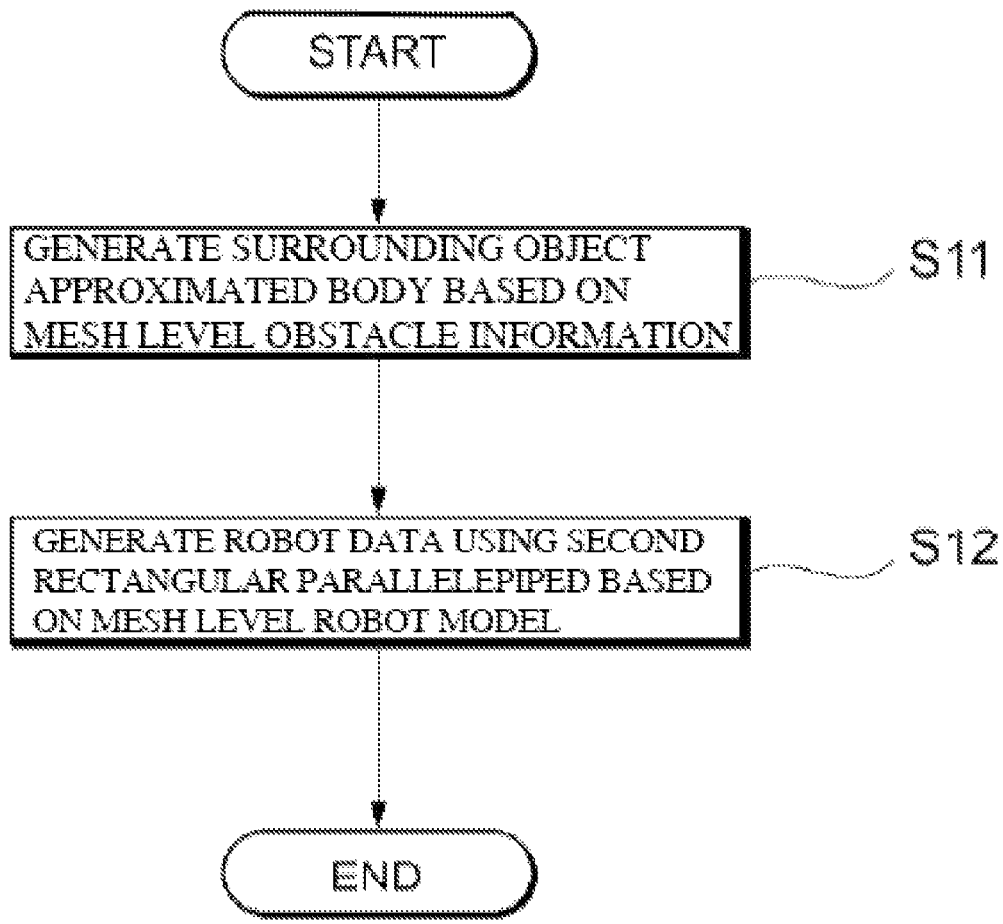
FIG. 3 is a flowchart illustrating pre-processing in an interference determination method according to a second embodiment.

FIG. 3 is a flowchart of pre-processing for generating data required for determination processing. This pre-processing is performed every time a nearby object, such as an obstacle, or the robot arm 16 is changed.

First, the interface 28 of the computing device 14 acquires, from the input unit 12, an obstacle model that serves as obstacle information and in which an obstacle or the like expressed using a mesh pattern or the like is expressed in a virtual space. The CPU 24 then generates a nearby object approximated body (an example of a "nearby object approximated body"), which is obtained by approximating the shape of a nearby object using the obstacle model expressed with a mesh pattern, by means of a first rectangular parallelepiped, a second rectangular parallelepiped, or by means of another known method, and stores the generated nearby object approximated body in the storage device 26 (step S11). In an embodiment, nearby object approximated body data $Obs_i$ (here, i is an integer that is 1 or greater and is smaller than or equal to the number of nearby objects) regarding a plurality of nearby objects that are approximated by first rectangular parallelepipeds is stored in the storage device 26.

The interface 28 also acquires, from the input unit 12, a robot model that serves as robot information and expresses the robot arm 16 using a mesh pattern or the like. The CPU 24 then segments the robot model expressed using a mesh pattern into respective links L of the robot arm 16, generates robot data that is obtained by approximating the respective links L using second rectangular parallelepipeds, and causes the storage device 26 to store the generated robot data (step S12). Note that steps S11 and S12 may also be performed in a reverse order or at the same time.

Next, an initial orientation S and a target orientation G of the robot arm 16 are input from the input unit 12. The initial orientation S is an orientation of the robot arm 16 when gripping a work W, which is an item to be gripped and is put in a container, for example, and the target orientation G is an orientation of the robot arm 16 when taking the work W out of the container and places the work W at its destination. The initial orientation S and the target orientation G are six-dimensional information for designating the rotation angles of the drive shafts of the robot arm 16, and can also be input from the input unit 12 using a teaching pendant or the like. The CPU 24 of the computing device 14 causes the interface 28 to acquire six-dimensional angle information for specifying the initial orientation S and the target orientation G, and causes the storage device 26 to store the acquired angle information. The initial orientation S and the target orientation G may also be given respectively as a leading-end initial orientation S' and a leading-end target orientation G' of the robot arm 16, and may be calculated by performing an inverse kinematics calculation based on the leading-end initial orientation S' and the leading-end target orientation G'. The leading-end initial position S' and the leading-end target position G' can be set by an operator using a teaching pendant (not shown), for example.

Thereafter, a path search is carried out to find a motion path from the initial orientation S to the target orientation G.

Specifically, a list of orientations $q_i$ that specify a motion path that does not cause interference with nearby objects is generated by repeatedly performing, from the initial orientation S until reaching the target orientation G, the interference determination method in which angle information is input regarding the respective drive shafts that specifies an orientation $q_i$ (an example of a "first orientation") of the robot arm 16 at a point on the motion path and an orientation $q_{i+1}$ (an example of a "second orientation") at a point on the motion path on the target orientation G side relative to the orientation $q_i$, and it is output whether or not interference with a nearby object will occur while the robot arm 16 moves from the orientation $q_i$ to the orientation $q_{i+1}$.

Here, the orientation $q_{i+1}$ is set so that the rotation angle of each of the drive shafts increases or decreases monotonously while the robot arm 16 is changing from the orientation $q_i$ to the orientation $q_{i+1}$.

Figure 4A:
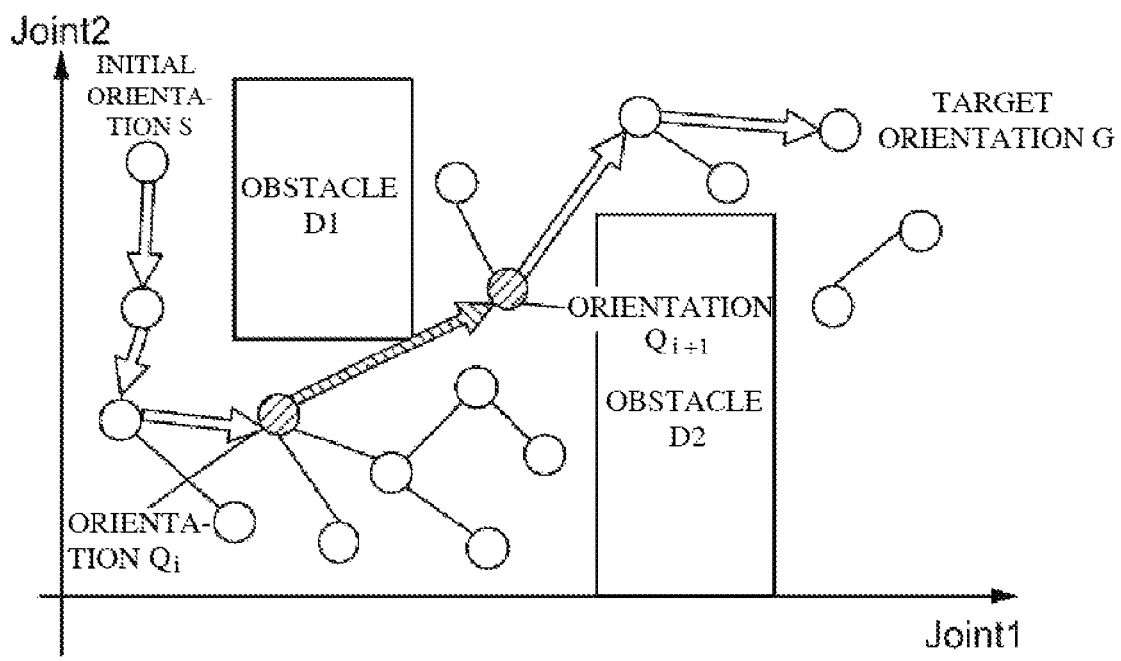
FIGS. 4A, 4B, and 4C are conceptual diagrams illustrating a configuration space.

FIG. 4A is a schematic diagram showing a state of searching for a motion path through which the robot arm 16 with two drive shafts moves from the initial orientation S to the target orientation G, in a configuration space with the rotation angles of the respective drive shafts serving as coordinate axes (Joint 1 and Joint 2). The orientation of this robot arm 16 can be denoted by the coordinates that correspond to the rotation angles of the respective drive shafts. Nearby obstacles D1 and D2 can be denoted as spaces each having a specific area, the spaces indicating ranges of the drive shafts in which the robot arm 16 will collide with the obstacles D1 and D2.

Accordingly, a motion path that will not cause interference can be derived by generating a motion path from the coordinates that correspond to the initial orientation S to the coordinates that correspond to the target orientation G so as not to enter the areas of the obstacles D1 and D2.

Figure 4B:
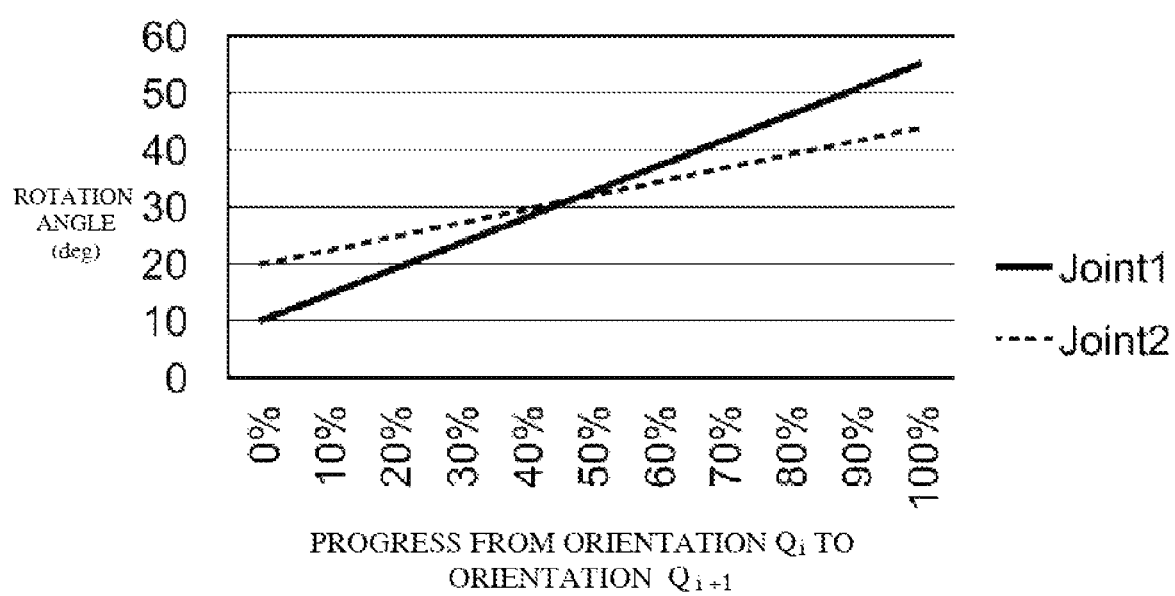

FIG. 4B illustrates the rotation angles of the respective drive shafts while the robot arm 16 is changing from the orientation $q_i$ to the orientation $q_{i+1}$, where the horizontal axis indicates the progress from the orientation $q_i$ to the orientation $q_{i+1}$, and the vertical axis indicates the rotation angles (degree) of the respective drive shafts (Joint 1 and Joint 2). It is indicated that the rotation angles of both drive shafts increase monotonically at constant speed.

By thus setting an orientation in a range where the rotation angles of the respective drive shafts increase or decrease monotonously as the orientation $q_{i+1}$, and performing interference determination between the orientation $q_i$ to the orientation $q_{i+1}$, it is possible to increase the accuracy of interference determination and perform interference determination computation at high speed. Note that, in a case where the a rotation angle both increases and decreases while the robot arm 16 is changing from the orientation $q_i$ to the orientation $q_{i+1}$, i.e. if interference determination is performed between orientations in which the rotation angle increases in the Joint 1-axis direction (proceeds rightward) and thereafter decreases (proceeds leftward) in the configuration space shown in FIG. 4A, the accuracy of interference determination may decrease, and it is more likely to be determined that no interference will occur, although interference will actually occur. For this reason, an embodiment does not employ such interference determination.

Figure 4C:
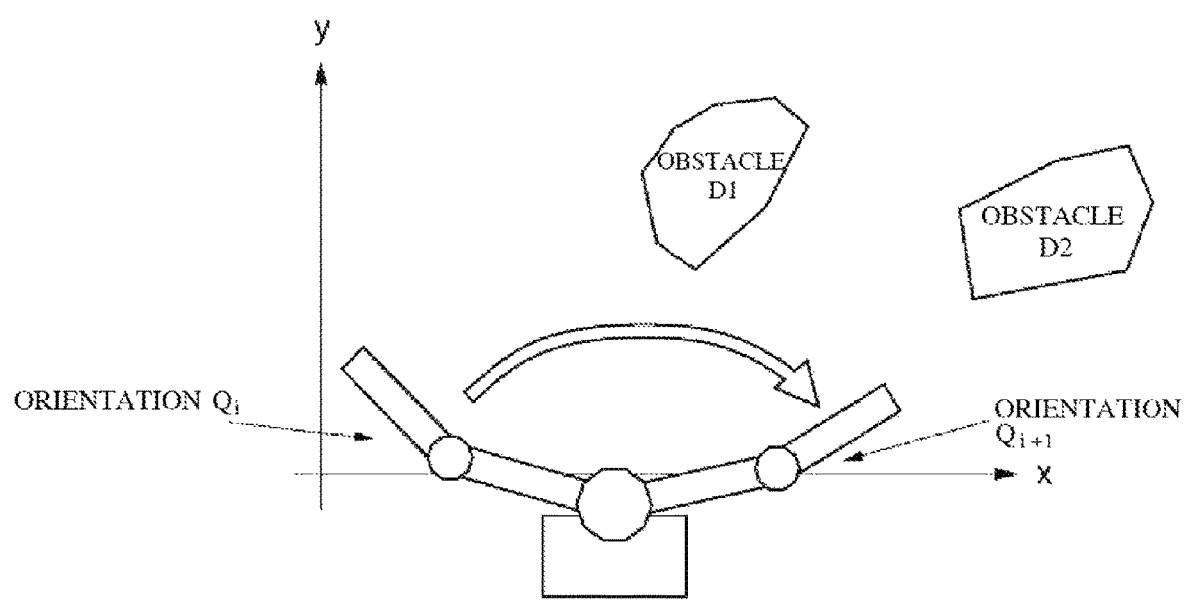

FIG. 4C shows, for reference, a state where the robot arm 16 is changing from the orientation $q_i$ to the orientation $q_{i+1}$ in the actual space.

Note that a path search can be carried out using various methods. Examples of available path search methods include RRT (Rapid-Exploring Random Tree), which is a random sampling method, PRM (Probabilistic Road Map), which is a roadmap method, artificial potential methods, trajectory optimization, and so on.

In RRT, which is a random sampling method, a path is generated by repeating processing to arrange a point corresponding to the orientation $q_{i+1}$ in the configuration space, and connect the arranged point to a point corresponding to the orientation $q_i$ that is already arranged in the configuration space.

In PRM (Probabilistic Road Map), a path is generated by randomly arranging a plurality of points corresponding to the orientation $q_i$ and the orientation $q_{i+1}$ in the configuration space, extracting points with which no interference with nearby objects will occur from the randomly arranged points, and connecting these extracted points.

In the artificial potential method, the potential in an area where the robot arm 16 and nearby objects are possibly located is calculated, and a path is generated based on the potential. For example, the potential in the area where the robot arm 16 and the nearby objects are possibly located is calculated using an evaluation function.

In trajectory optimization, a path is generated by solving an optimization problem of a cost function associated with arrangement of a point corresponding to the orientation $q_n$ in the configuration space. The cost functions refers to a function that is set based on, for example, the distances between the robot arm 16, a target item, and a nearby object (obstacle), the smoothness of a path in the configuration space, the largest value of torque that is to be generated by a plurality of drive shafts of the robot arm 16, or the like.

Figure 5:
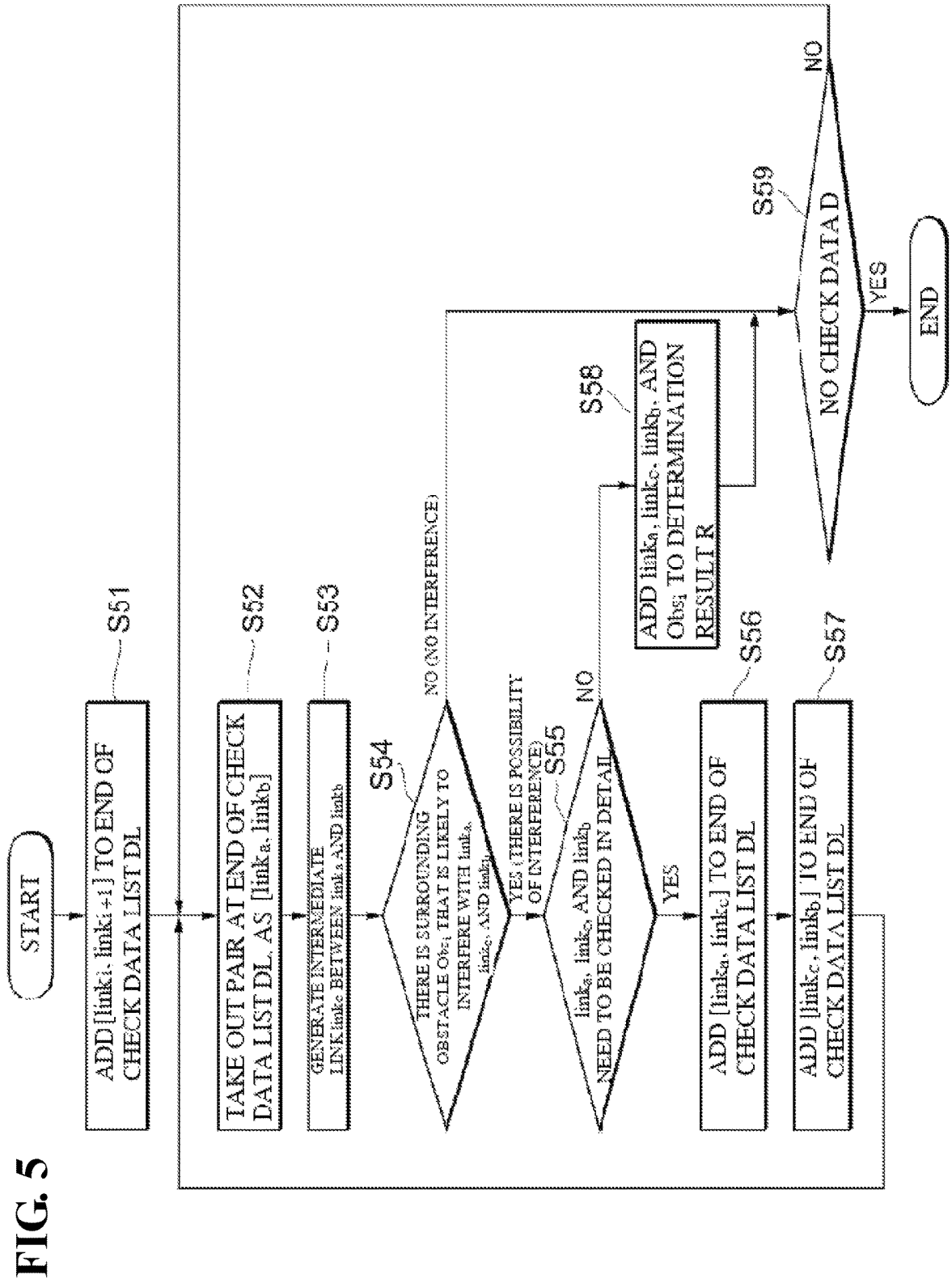
FIG. 5 is a flowchart illustrating an interference determination method according to a second embodiment.

FIG. 5 is a flowchart illustrating the interference determination method regarding interference between a specific link L of the robot arm 16 and a nearby object on the motion path through which the robot arm 16 move from the orientation $q_i$ to the orientation $q_{i+1}$. FIG. 6 illustrates changes in a check data list DL that is used in this interference determination method. Here, the check data list DL refers to a stack data structure for storing a plurality of pieces of check data D, and is configured so as to enable last-in, first-out (LIFO) of the check data D. The check data D refers to data that specifies two orientations at a starting point and an ending point that are subjected to interference determination. In an embodiment, an intermediate orientation on a path connecting two orientations is computed based on this check data D, and a first (or second or subsequent) combined approximated body is generated that includes robot approximated body data corresponding to at least three orientations, namely the two orientations included in the check data D and an intermediate orientation.

Figure 6A:
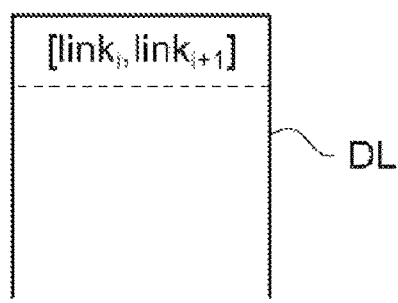
FIGS. 6A to 6F are conceptual diagrams illustrating changes in a check data list DL.

First, the computing device 14 records [$link_i$, $link_{i+1}$] as the check data D at the end of the check data list DL, which is provided in a specific area of the storage device 26 (step S51, FIG. 6A). The check data D [$link_i$, $link_{i+1}$] specifies the orientations of the specific link L (an example of a "portion of interest") that correspond to the orientation $q_i$ and the orientation $q_{i+1}$ of the robot arm 16.

Figure 7A:
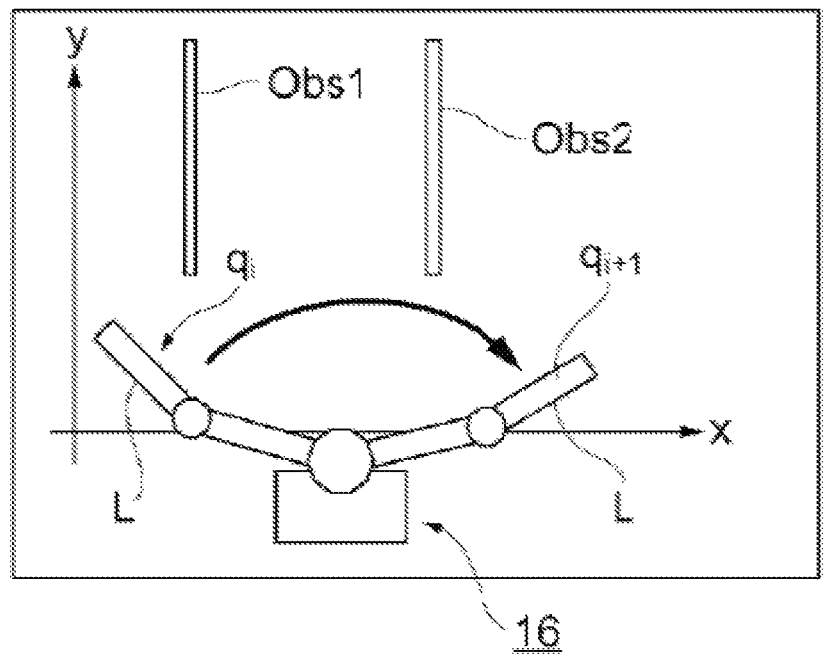
FIGS. 7A and 7B are schematic diagrams illustrating a state where a robot arm is changing its orientation.
Figure 7B:
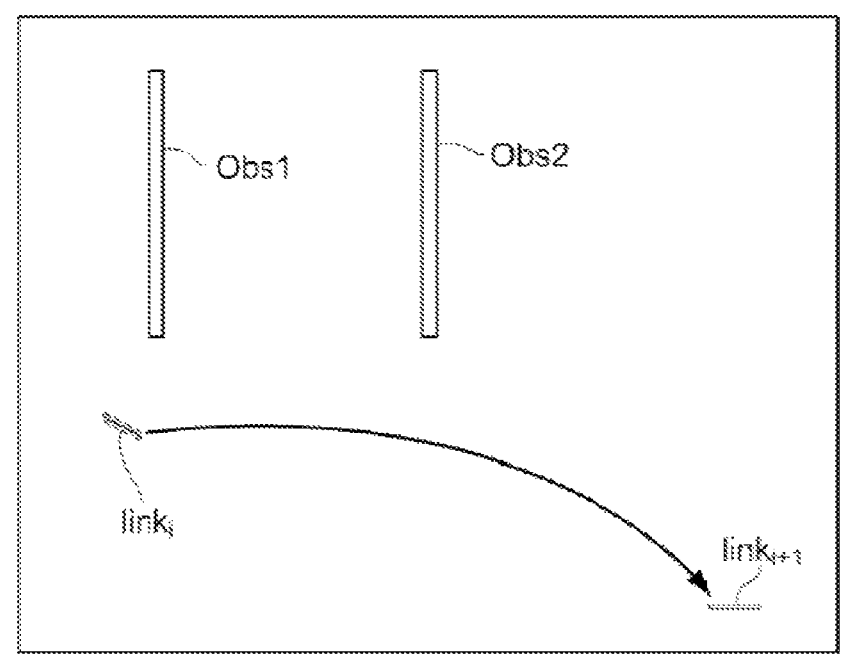

FIG. 7A schematically shows the robot arm 16 moving from the orientation i to the orientation $q_{i+1}$, and nearby obstacles. FIG. 7B shows robot approximated bodies obtained by approximating a leading-end link L of the robot arm 16 in the orientation $q_i$ and the orientation $q_{i+1}$, using second rectangular parallelepipeds, and nearby object approximated body data $Obs_1$ and $Obs_2$ that correspond to two nearby objects.

Next, the computing device 14 takes out the check data D at the end of the check data list DL, as [$link_a$, $link_b$] (step S52). Here, [$link_i$, $link_{i+1}$] that was recorded in step S51 as the check data D at the end of the check data list DL is taken out as [$link_a$, $link_b$], and [$link_i$, $link_{i+1}$] that is the check data D taken out from the check data list DL is deleted. $link_a$ is an example of the "first orientation" of the "portion of interest" in a course search state, and $link_b$ is an example of the "second orientation" of the "portion of interest" in the course search state.

Next, $link_c$, which specifies an intermediate link between $link_a$ and $link_b$, is generated by the computing device 14 (step S53).

Figure 8:
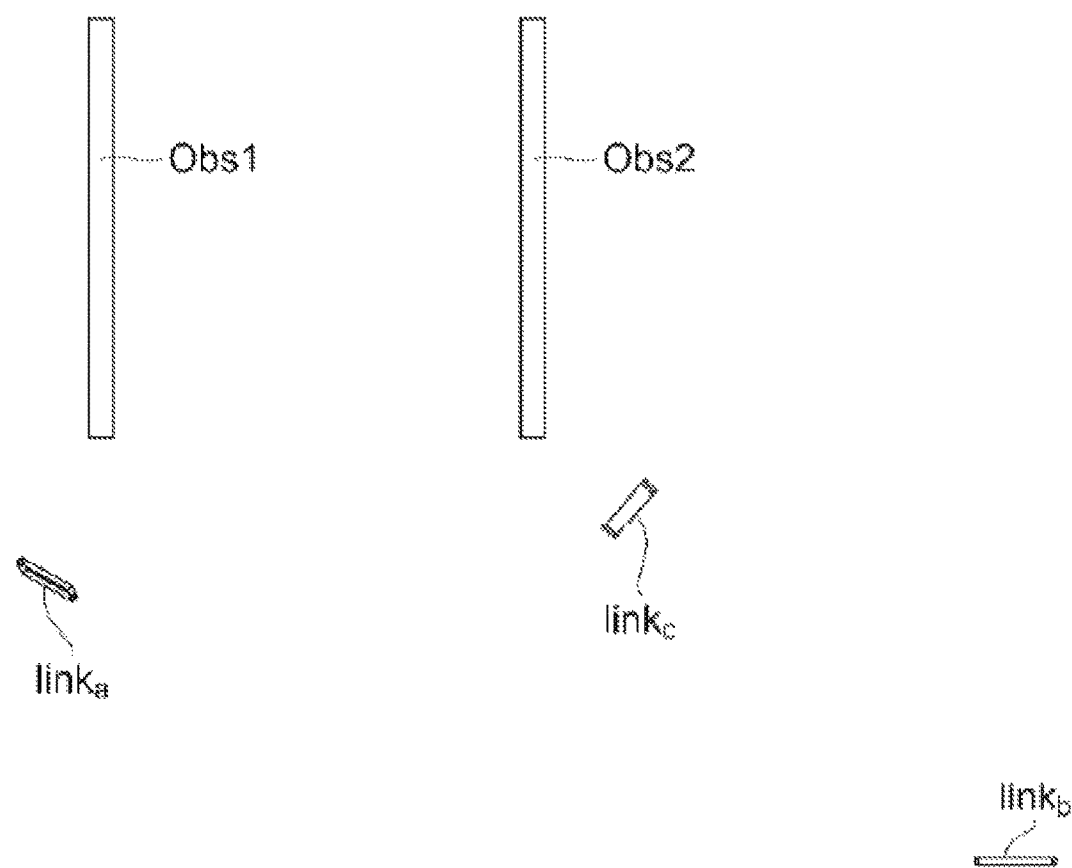
FIG. 8 is a diagram illustrating robot approximated body data of $link_a$, $link_b$, and $link_c$.

FIG. 8 shows the setting of $link_c$, which is an intermediate link between $link_a$ and $link_b$.

The intermediate link, namely $link_c$ can be set by solving forward kinematics based on an average value of a joint value (an example of a "rotation angle") that indicates the rotation angle of each drive shaft at the time of $link_a$ and a joint value that indicates the rotation angle of each drive shaft at the time of $link_b$. In this case, a midpoint between the coordinates corresponding to $link_a$ and the coordinates corresponding to $link_b$ in the configuration space is the coordinates corresponding to $link_c$. That is to say, the coordinates P corresponding to $link_a$ in the configuration space is $Plink_a$= (ja1, ja2, ... ja6) (ja1, ja2, ... ja6 indicate the rotation angles of the respective rotary shafts), and the coordinates P corresponding to $link_b$ are $Plink_b$=(jb1, jb2, ... jb6). A midpoint between the coordinates of $Plink_a$ and the coordinates of $Plink_b$ corresponds to the coordinates of $link_c$.

The intermediate link can also be set using other methods. For example, the rotational speed of the link L of the robot arm 16 is not constant but increases and decreases. For this reason, considering changes in the rotational speed of each link L, the intermediate link $link_c$ can also be set more accurately by obtaining the rotation angles of the respective drive shafts at an intermediate point in time while the robot arm 16 is moving from $link_a$ to $link_b$, and solving forward kinematics based on the obtained rotation angles. That is to say, not all of the drive shafts operate uniformly in a period of moving from $link_a$ to $link_b$, but there are drive shafts that operate only during a portion of first half of an operation or a portion of latter part of the operation. Accordingly, the intermediate link $link_c$ can be set more accurately by obtaining the rotation angles of the respective drive shafts at an intermediate point in time while the robot arm 16 is moving from $link_a$ to $link_b$, and solving forward kinematics based on the obtained rotation angles.

Next, the computing device 14 determines the possibility of interference between approximated bodies obtained by approximating $link_a$, $link_b$, and $link_c$ and the nearby objects (step S54). Specifically, robot approximated bodies (each of which is an example of a "robot approximated body") are generated, which are obtained by approximating the shape of the link L corresponding to $link_a$, $link_b$, and $link_c$, using second rectangular parallelepipeds. Then, first combined approximated body (an example of a "first combined approximated body") is generated, which is obtained by approximating these robot approximated bodies using a first rectangular parallelepiped, and the possibility of interference between the first combined approximated body and the nearby object approximated body data $Obs_1$ and $Obs_2$ is determined.

The robot approximated body corresponding to $link_a$ can be calculated based on the joint values of the respective drive shafts in the orientation $q_i$, the length of each link L, and the robot data of the link L stored in step S12, and can be calculated as values of respective vertices that specify a second rectangular parallelepiped. A second rectangular parallelepiped may be generated using an OBB (Oriented Bounding Box).

Similarly, robot approximated bodies are also calculated for $link_b$ and $link_c$.

Next, the largest value and smallest value of the coordinates of respective vertices of these three robot approximated bodies are extracted for each of the coordinate axes, thereby calculating a first combined approximated body that is configured by combining these three robot approximated bodies. Here, the first combined approximated body may be generated so as to be inscribed with the vertices of the robot approximated bodies, or the first combined approximated body may be generated that includes the robot approximated bodies so as to be distant from them by a specific distance.

Then, the possibility of interference between the first combined approximated body and the nearby object approximated body data $Obs_1$ and $Obs_2$ is determined. First, the shortest distance m between the first combined approximated body and the nearby object approximated body data $Obs_i$ is calculated. The shortest distance m can be calculated by comparing the coordinates of the first combined approximated body with those of the respective nearby object approximated bodies.

Next, the shortest distance m is compared with a threshold for determining whether or not there is a possibility of interference. Although the threshold may be a preset value or may be any other value, (L2+L3−L1) is used as the threshold in an embodiment, as will be described below. That is to say, the inter-link distance L2 between $link_a$ and $link_b$, the inter-link distance L3 between $link_b$ and $link_c$, and the inter-link distance L1 between $link_a$ and $link_c$ are calculated based on the coordinates of a specific position of the link L in the respective orientations, and then (L2+L3−L1) is calculated. L1 indicates the inter-link distance in a current state, (L2+L3) indicates the inter-link distance in the next state. Thus, if it is assumed that the link L makes an arc motion, the relation (L2+L3)>L1 holds. At this time, even if the link L of the robot arm 16 positioned at a certain point on the actual trajectory connecting the initial orientation to the target orientation protrudes from the first combined approximated body, it can be reasonably estimated that the amount of protrusion is (L2+L3−L1) at most. Accordingly, (L2+L3−L1) is compared with m, and if (L2+L3−L1) is greater than m, it is determined that there is a possibility that the nearby object approximated body data $Obs_i$ interferes with the link L while the robot arm 16 is moving from while the robot arm 16 is moving from $link_a$ and $link_c$.

Figure 9:
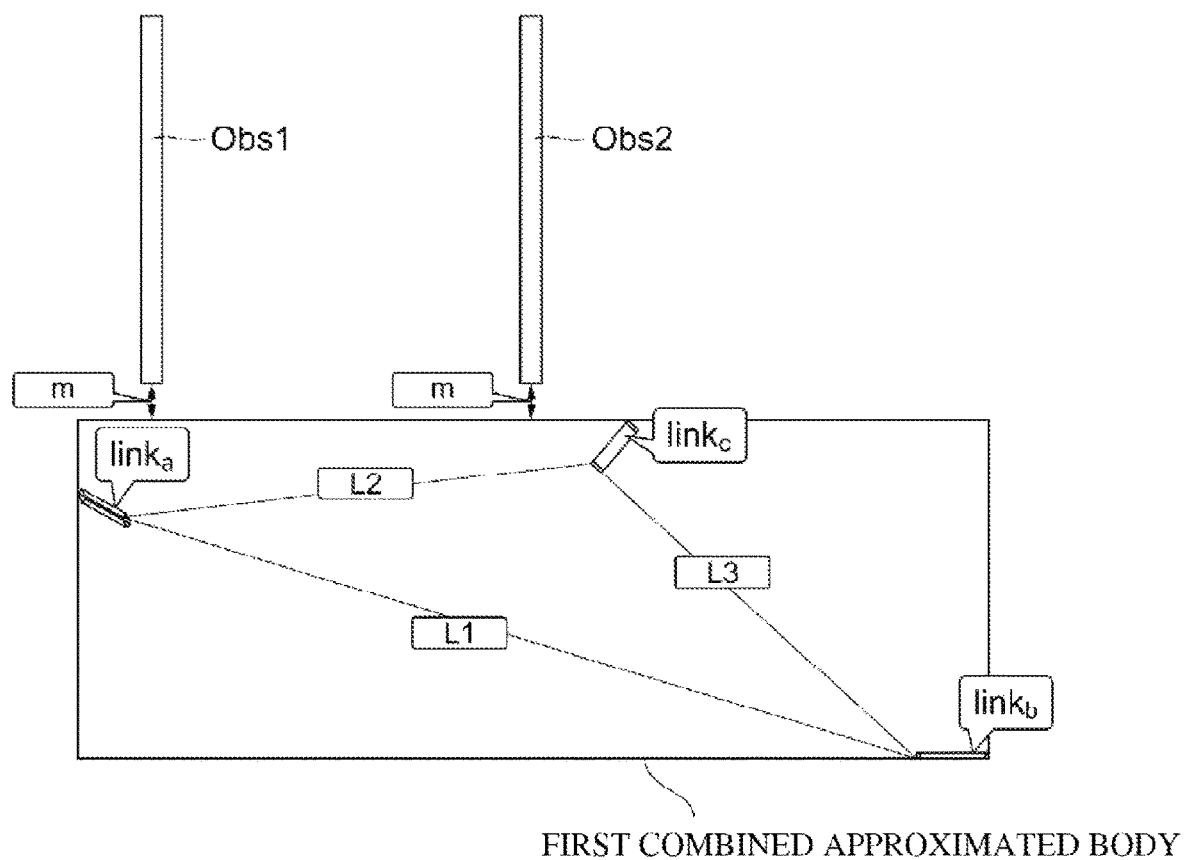
FIG. 9 is a diagram illustrating a first combined approximated body and nearby object approximated bodies.

FIG. 9 shows a state where it is determined that there is a possibility of interference between the first combined approximated body and the nearby object approximated body data $Obs_1$ and $Obs_2$.

If, in step S54, there is nearby object approximated body data $Obs_i$ with which there is a possibility of interference (YES), in the following step S55, the computing device 14 determines whether interference determination (with higher resolution) needs to be performed for $link_a$, $link_b$, and $link_c$ in more detail (YES), or the respective orientations are sufficiently close to each other and thus the resolution is sufficient, and accordingly, interference determination according to an embodiment with higher resolution is not needed (NO).

Specifically, if both of the following two conditions are not satisfied, interference determination is performed with a higher resolution.

The first condition is whether the movement trajectory of the link L from $link_a$ to $link_b$ via $link_c$ sufficiently reproduces the actual movement trajectory. If the actual movement trajectory is sufficiently reproduced, it is determined that a more detailed, high-speed interference determination according to an embodiment is not needed (NO).

Figure 10A:
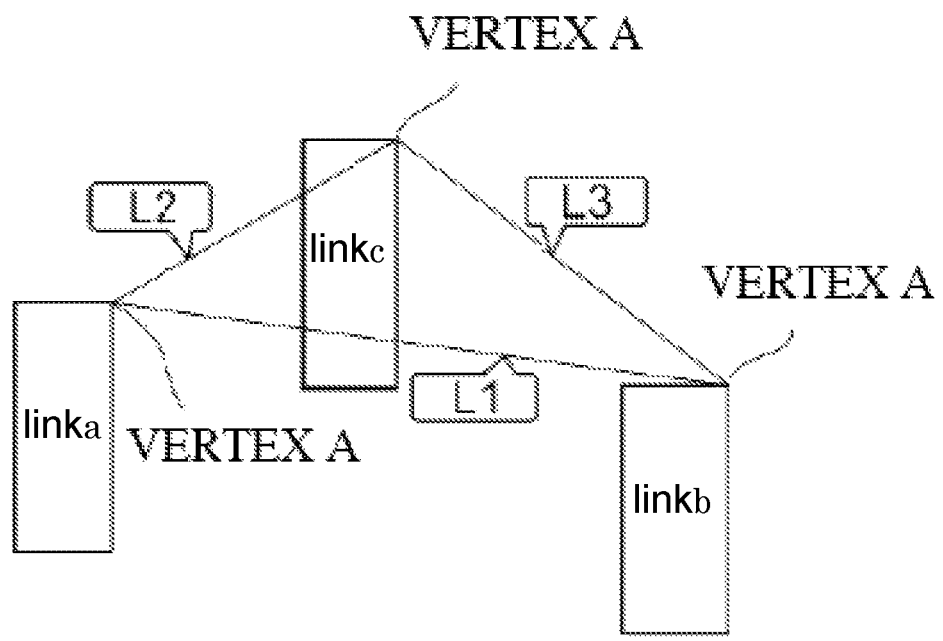
FIGS. 10A and 10B are schematic diagrams illustrating conditions for determining a necessity for interference determination with a higher resolution.

FIG. 10A is a schematic diagram illustrating the first condition. As shown in this diagram, based on the robot approximated bodies of $link_a$, $link_b$, and $link_c$, L1/(L2+L3), which is the ratio of the inter-link distance L1 in the current state to the inter-link distance (L2+L3) in the next state at a specific vertex A of the link L in each of the orientations, is calculated as a reproduction rate of the movement trajectory. Here, since L1/(L2+L3)≤1, it can be considered that the closer the values of the inter-link distance L1 and the inter-link distance (L2+L3) are to each other, and the closer the reproduction rate is to 1, the movement trajectory of the link L from $link_a$ to $link_b$ via $link_c$ reproduces the actual movement trajectory more sufficiently.

Next, the reproduction rate is calculated similarly for a vertex B, which is a vertex that is diagonal with respect to the vertex A. That is to say, the reproduction rate is calculated similarly for each of the vertices of the second rectangular parallelepipeds, the vertex being located at positions diagonal with respect to the vertex A, which is set in the respective robot approximated bodies obtained by approximating the link L using second rectangular parallelepipeds.

Then, the larger one of these reproduction rates is compared with a specific value to determine whether or not the first condition is satisfied. The specific value may be a value that is 0.8 or greater, and is smaller than 1.0, for example. By thus calculating the reproduction rate for the two points corresponding to vertices diagonal with respect to each other, accurate determination can be made by using the reproduction rate for the diagonal vertices, even if the link L operates with one end thereof serving as a base point, and the reproduction rate at a vertex that is close to the base point and hardly moves is an abnormal value.

The second condition is whether or not the interval between $link_a$ and $link_b$ (an example of an "amount indicating an interval") is sufficiently narrow. If it can be considered that the interval between $link_a$ and $link_b$ is sufficiently narrow, it is determined that no more detailed, high-speed interference determination according to an embodiment is needed (NO).

Figure 10B:
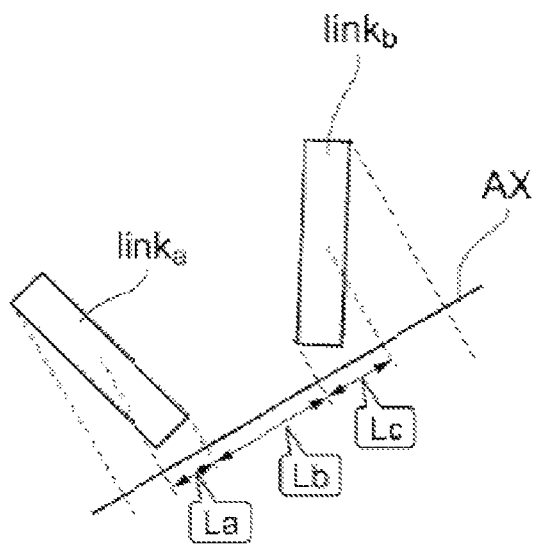

FIG. 10B illustrates the determination as to whether or not the interval between links is sufficiently narrow. Specifically, the robot approximated body data regarding $link_a$ and $link_b$ is projected onto a separate axis AX (e.g. any of the x axis, y axis, and z axis), and the coordinates of the center points and the respective vertices of $link_a$ and $link_b$ are acquired. On the separate axis AX, the distance between closest vertices is assumed as Lb, the distances between these vertices and the respective center points are assumed as La and Lc, and Lb/(La+Lc) is compared with a specific value. For example, if the relation Lb/(La+Lc)>3 holds on any of the axes, it cannot be considered that the interval is sufficiently narrow on this axis, and thus the second condition is not satisfied. If Lb/(La+Lc)≤3 holds on all of the axes, the second condition is satisfied.

If none of the conditions is satisfied, it means that the possibility of interference has been indicated in a low-resolution state. Thus, processing proceeds to step S56 onward to perform interference determination with a higher resolution (YES).

Figure 6B:
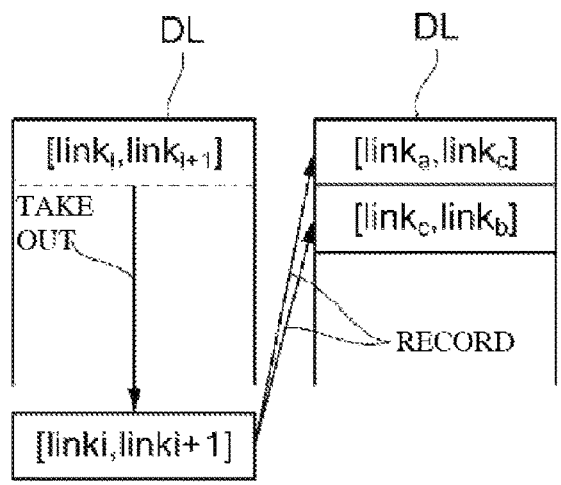

The check data list DL when the processing proceeds to step S56 is shown on the right side of FIG. 6B. [$link_i$, $link_{i+1}$] that had been recorded at the end of the check data list DL was taken out as [$link_a$, $link_b$] and accordingly was already deleted, but instead, [$link_a$, $link_c$] (step S56) and [$link_c$, $link_b$] (step S57), which are orientations that are likely to be checked in detail in step S56, are recorded in order (FIG. 6B).

Then, the processing returns to step S52, and [$link_c$, $link_b$] recorded at the end of the check data list DL is taken out as [$link_a$, $link_b$]. Next, in step S53, an intermediate link, namely $link_c$ is set, and in step S54, a second combined approximated body (an example of a "second combined approximated body") is generated that is configured by combining three robot approximated bodies corresponding to the newly-set $link_a$, $link_b$, and $link_c$.

Figure 11:
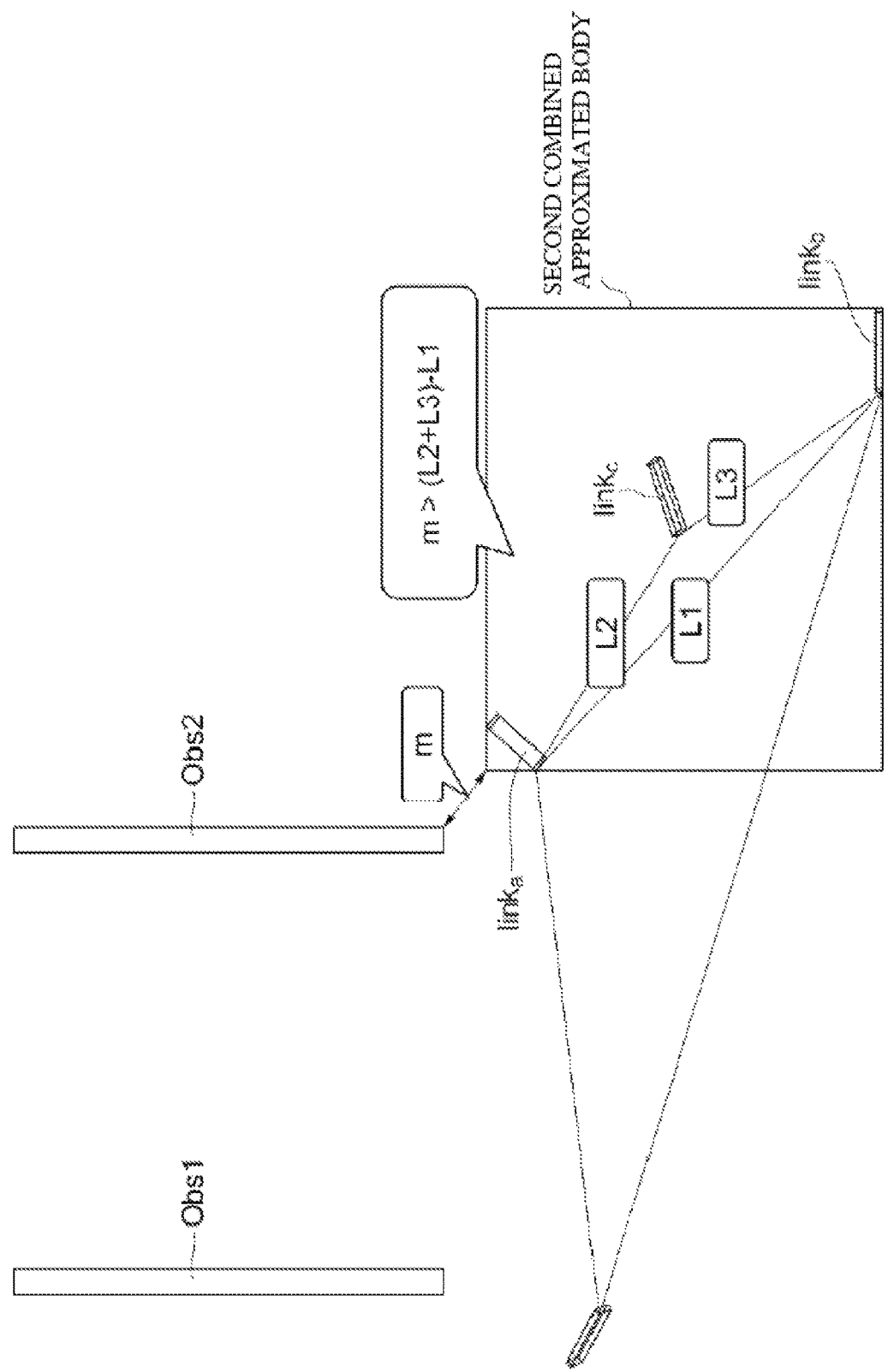
FIG. 11 is a diagram illustrating a second combined approximated body and nearby object approximated bodies.

FIG. 11 shows the second combined approximated body. As shown in this diagram, the second combined approximated body is smaller than the first combined approximated body. Here, being small means that the value of the area or volume of a combined approximated body is relatively small. As mentioned above, the value of (L2+L3−L1), which is calculated based on the inter-link distances L2, L3, and L1, is compared with the value of m that indicates the distance between the second combined approximated body and the nearby object approximated body data $Obs_i$, and interference determination is performed for these values. FIG. 11 shows a state where the relation m≥(L2+L3−L1) holds, and it is accordingly determined that there is no possibility of interference (NO).

Figure 6C:
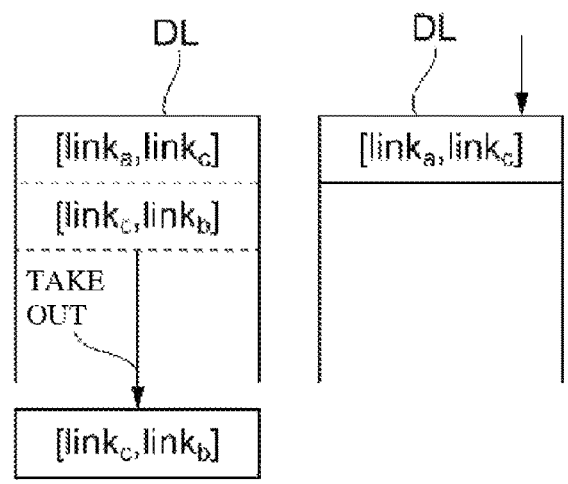

If the result in step S54 is NO, in step S59, whether or not any check data D is left in the check data list DL can be checked by the computing device 14 (step S59). If no check data D is left and the check data list DL is empty (YES), the flowchart ends. If the check data list DL is not empty (NO), the processing returns to step S52. Here, as shown in FIG. 6C, [$link_c$, $link_b$] that had been recorded in the check data list DL in step S57 was taken out and deleted, but [$link_a$, $link_c$] that was recorded in the check data list DL in step S56 is left, and thus the processing returns to step S52.

Thereafter, in step S52, [$link_a$, $link_c$] is taken out as [$link_a$, $link_b$], and $link_c$ corresponding to an intermediate link therebetween is generated (step S53).

Figure 12:
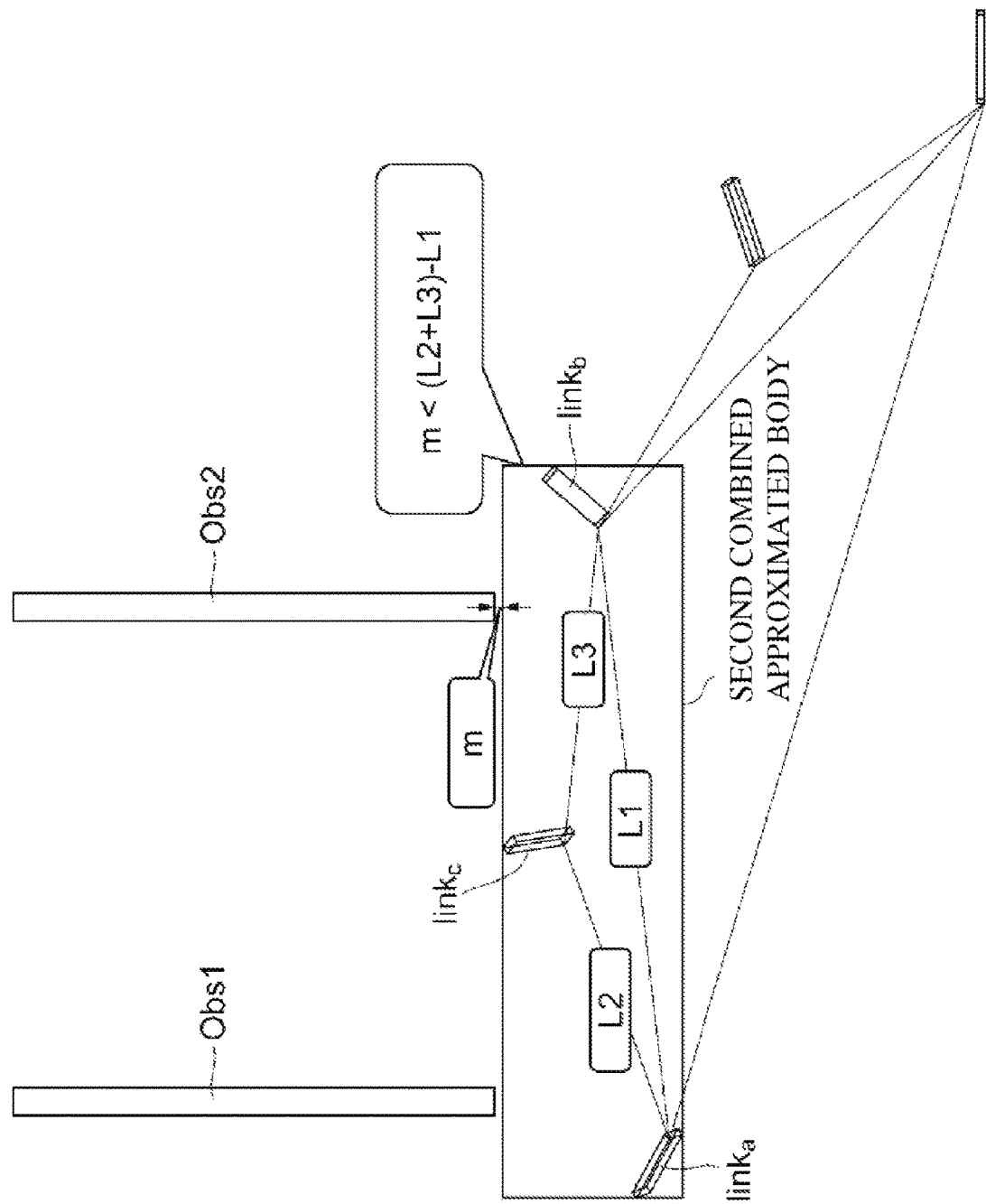
FIG. 12 is a diagram illustrating another second combined approximated body and nearby object approximated bodies.

FIG. 12 shows the newly-set $link_a$, $link_b$, and $link_c$, and a second combined approximated body (an example of a "second combined approximated body") that is configured by combining three robot approximated bodies corresponding to $link_a$, $link_b$, and $link_c$. If the relation m<(L2+L3−L1) holds as shown in this diagram, the processing proceeds to step S55.

Figure 6D:
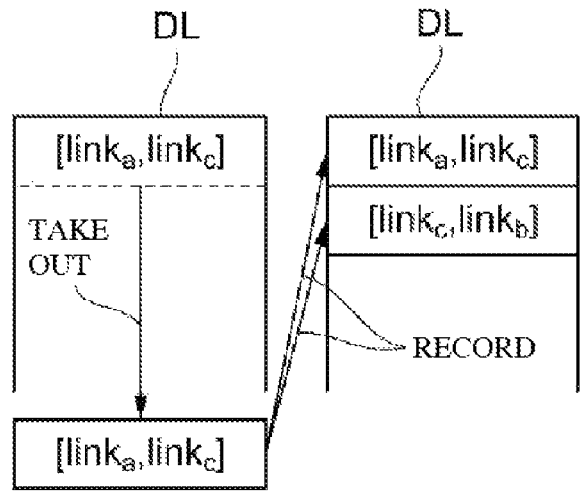

If, in step S55, the resolution in interference determination is low, the processing proceeds to steps S56 and S57 and then returns to step S52. The check data list DL at this time is shown in FIG. 6D.

Figure 13:
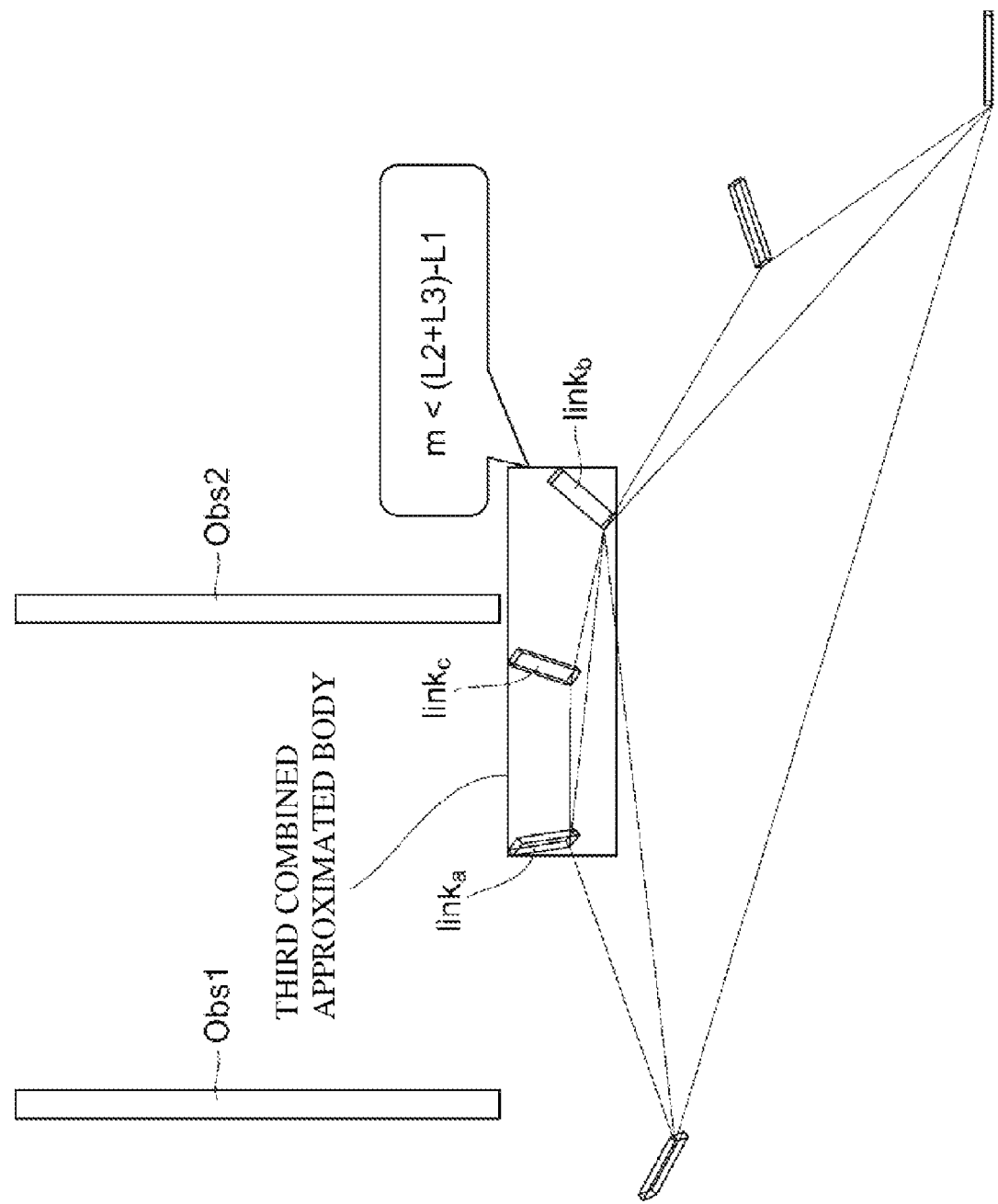
FIG. 13 is a diagram illustrating a third combined approximated body and nearby object approximated bodies.

FIG. 13 shows a third combined approximated body, which is configured, after the processing has returned to step S52, by setting $link_c$ and $link_b$ in FIG. 12 as $link_a$ and $link_b$, respectively, generating $link_c$ corresponding to an intermediate link between the newly-set $link_a$ and $link_b$, and combining three robot approximated bodies corresponding to link$_a$, link$_b$, and link$_c$. As shown in this diagram, the third combined approximated body is smaller than the second combined approximated body. If the relation m<(L2+L3−L1) holds as shown in this diagram, the processing again proceeds to step S55.

Figure 6E:
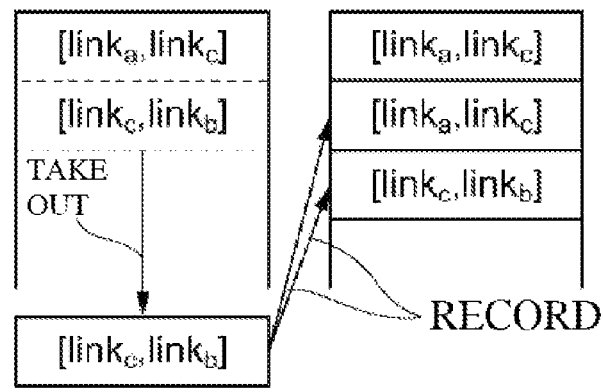

If, in step S55, the resolution in interference determination is low, the processing proceeds to steps S56 and S57 and then returns to step S52. The check data list DL at this time is shown in FIG. 6E.

Figure 14:
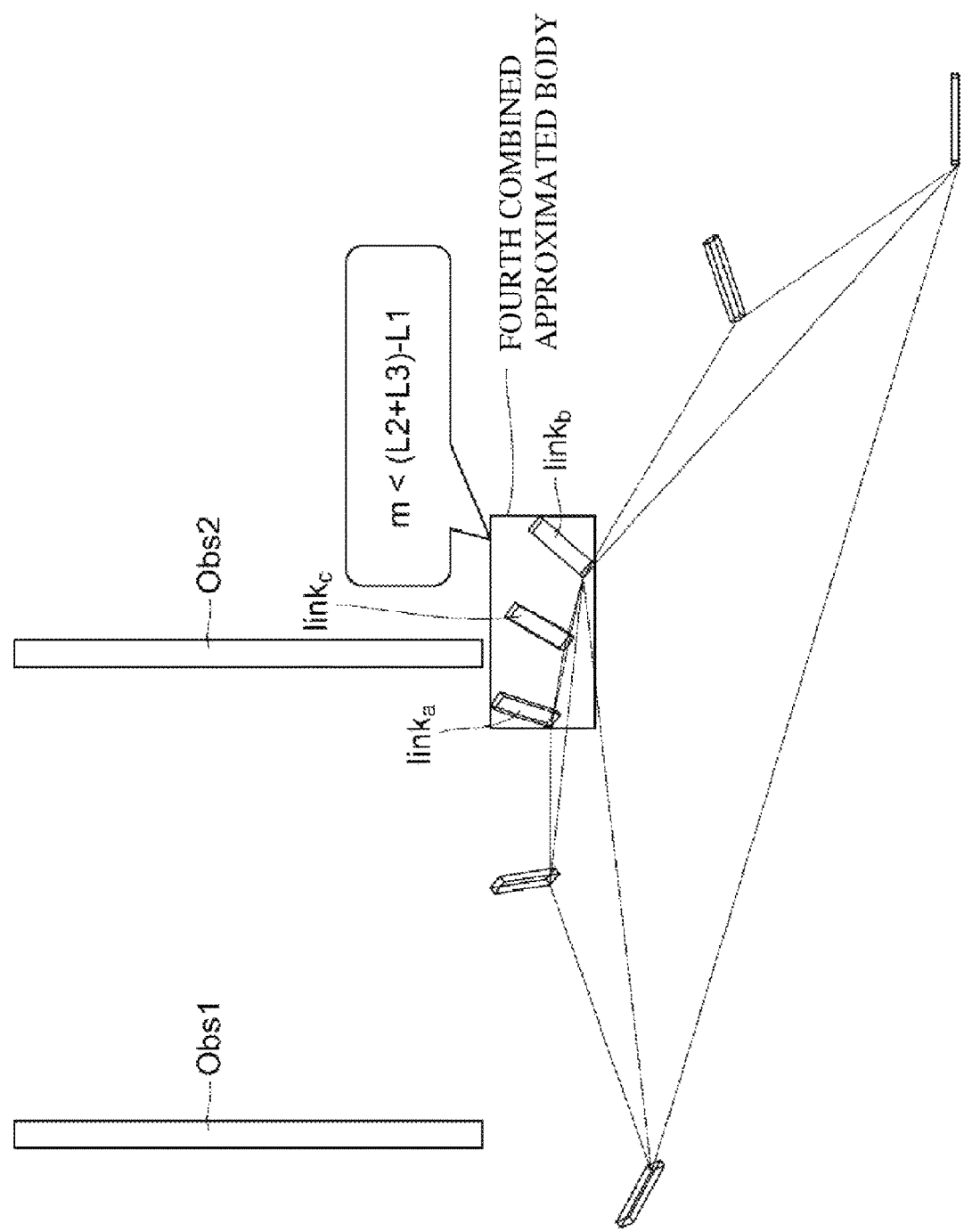
FIG. 14 is a diagram illustrating a fourth combined approximated body and nearby object approximated bodies.

FIG. 14 shows a fourth combined approximated body, which is configured, after the processing has returned to step S52, by setting link$_c$ and link$_b$ in FIG. 13 as link$_a$ and link$_b$, respectively, generating link$_c$ corresponding to an intermediate link between the newly-set link$_a$ and link$_b$, and combining three robot approximated bodies corresponding to link$_a$, link$_b$, and link$_c$. As shown in this diagram, the fourth combined approximated body is smaller than the third combined approximated body. If the relation m<(L2+L3−L1) holds as shown in this diagram, the processing again proceeds to step S55.

Figure 6F:
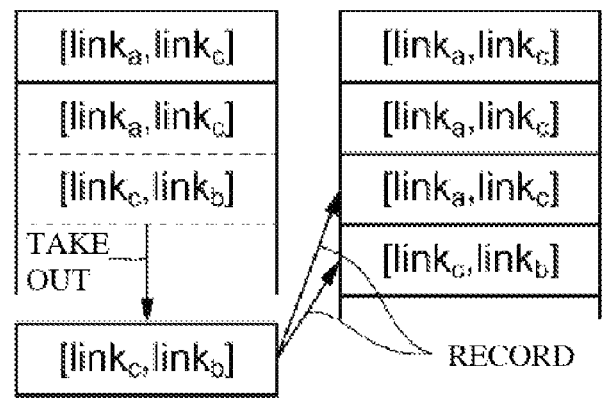

If, in step S55, the resolution in interference determination is low, the processing proceeds to steps S56 and S57 and then returns to step S52. The check data list DL at this time is shown in FIG. 6F.

Figure 15:
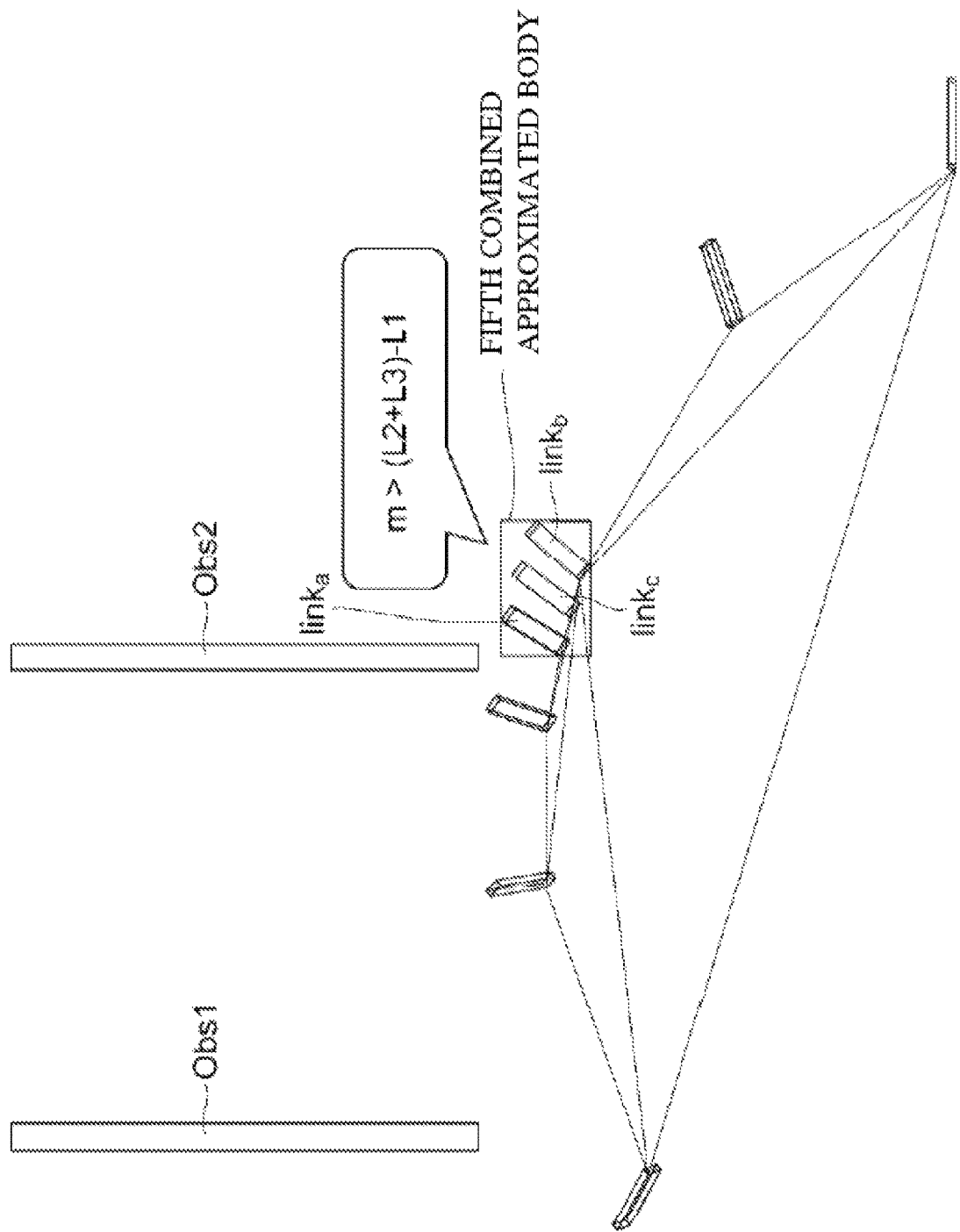
FIG. 15 is a diagram illustrating a fifth combined approximated body and nearby object approximated bodies.

FIG. 15 shows a fifth combined approximated body, which is configured, after the processing has returned to step S52, by setting link$_c$ and link$_b$ in FIG. 14 as link$_a$ and link$_b$, respectively, generating link$_c$ corresponding to an intermediate link between the newly-set link$_a$ and link$_b$, and combining three robot approximated bodies corresponding to link$_a$, link$_b$, and link$_c$. As shown in this diagram, the fifth combined approximated body is smaller than the fourth combined approximated body. If the relation m>(L2+L3−L1) holds as shown in this diagram, the processing proceeds to step S59.

In step S59, the check data list DL is not empty (NO), and thus the processing returns to step S52, and the check data D at the end of the check data list DL is taken out.

Figure 16:
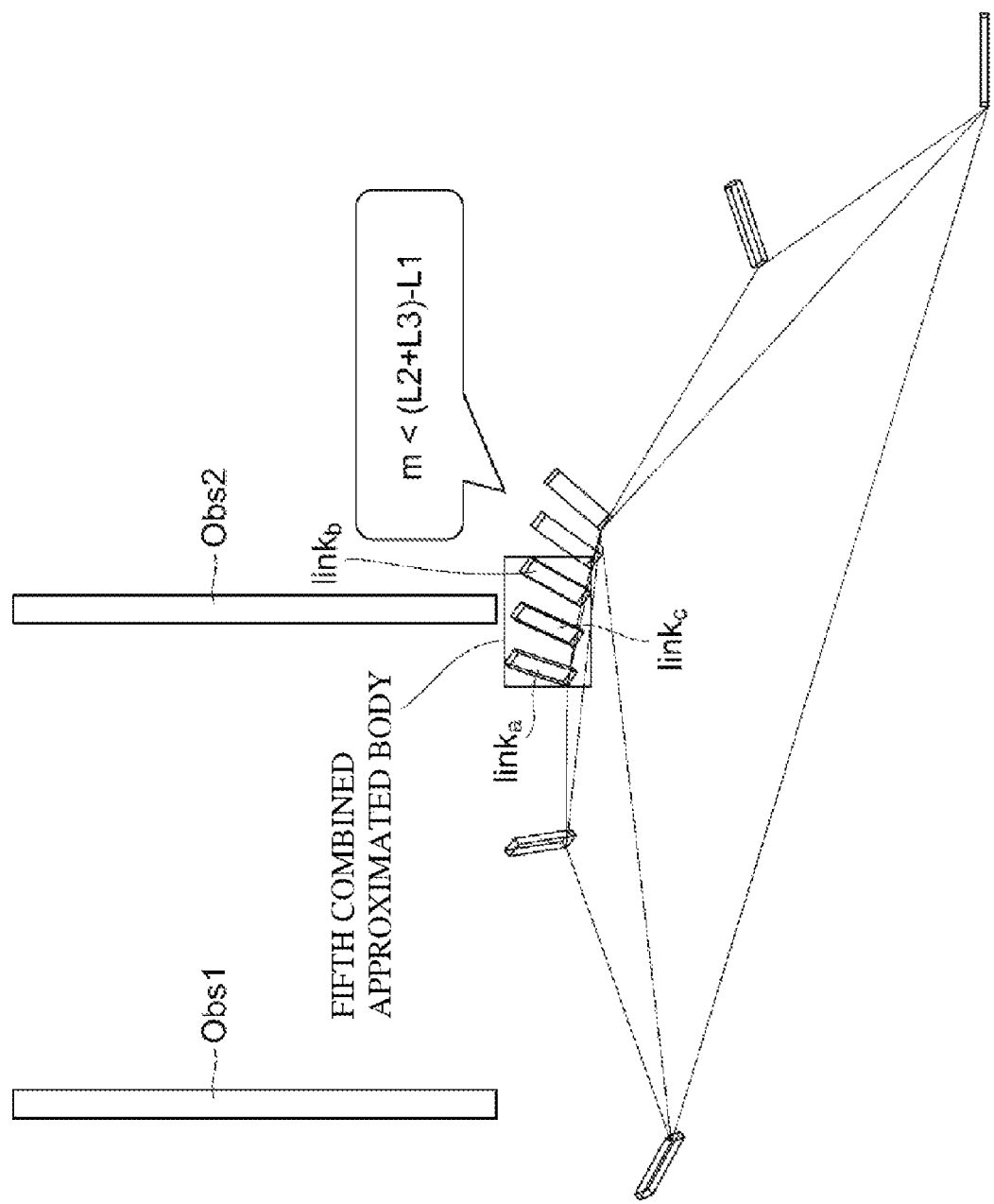
FIG. 16 is a diagram illustrating another fifth combined approximated body and nearby object approximated bodies.

FIG. 16 shows a fifth combined approximated body, which is configured by setting link$_a$ and link$_c$ in FIG. 14 as link$_a$ and link$_b$, respectively, generating link$_c$ corresponding to an intermediate link between the newly-set link$_a$ and link$_b$, and combining three robot approximated bodies corresponding to link$_a$, link$_b$, and link$_c$. If the relation m<(L2+L3−L1) holds as shown in this diagram, the processing again proceeds to step S55.

If, in step S55, the resolution in interference determination is low, the processing proceeds to steps S56 and S57 and then returns to step S52.

Figure 17:
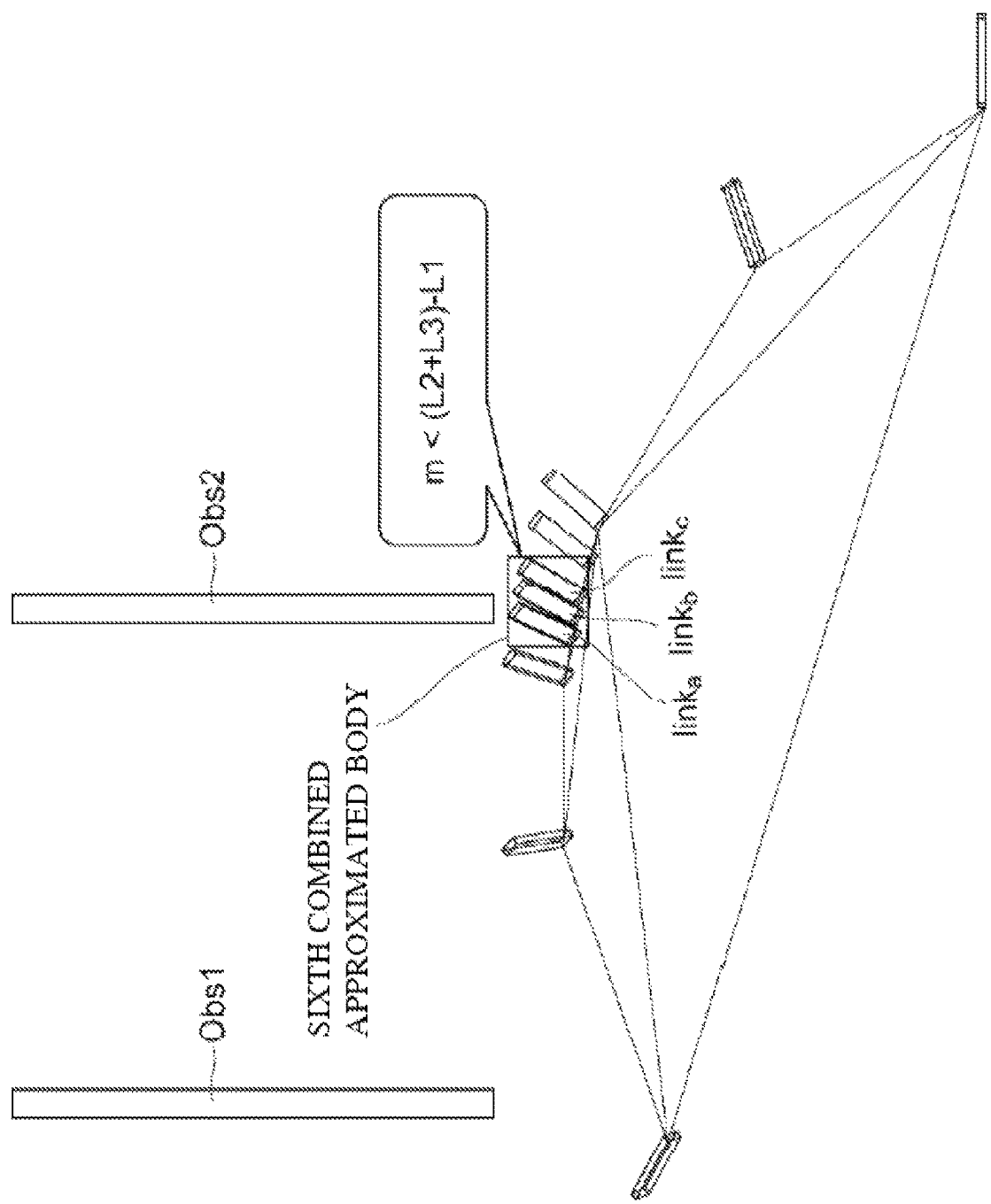
FIG. 17 is a diagram illustrating a sixth combined approximated body and nearby object approximated bodies.

FIG. 17 shows a sixth combined approximated body, which is configured by setting link$_c$ and link$_b$ in FIG. 16 as link$_a$ and link$_b$, respectively, generating link$_c$ corresponding to an intermediate link between the newly-set link$_a$ and link$_b$, and combining three robot approximated bodies corresponding to link$_a$, link$_b$, and link$_c$. If the relation m<(L2+L3−L1) holds as shown in this diagram, the processing again proceeds to step S55.

If, in step S55, the first condition or the second condition is satisfied, the processing proceeds to step S58.

In step S58, link$_a$, link$_b$, link$_c$, and a nearby object corresponds to the nearby object approximated body data Obs$_i$ at this time are recorded as a determination result R. Then the processing proceeds to step S59, and the same processing is repeated on check data D that is left in the check data list DL.

Figure 18:
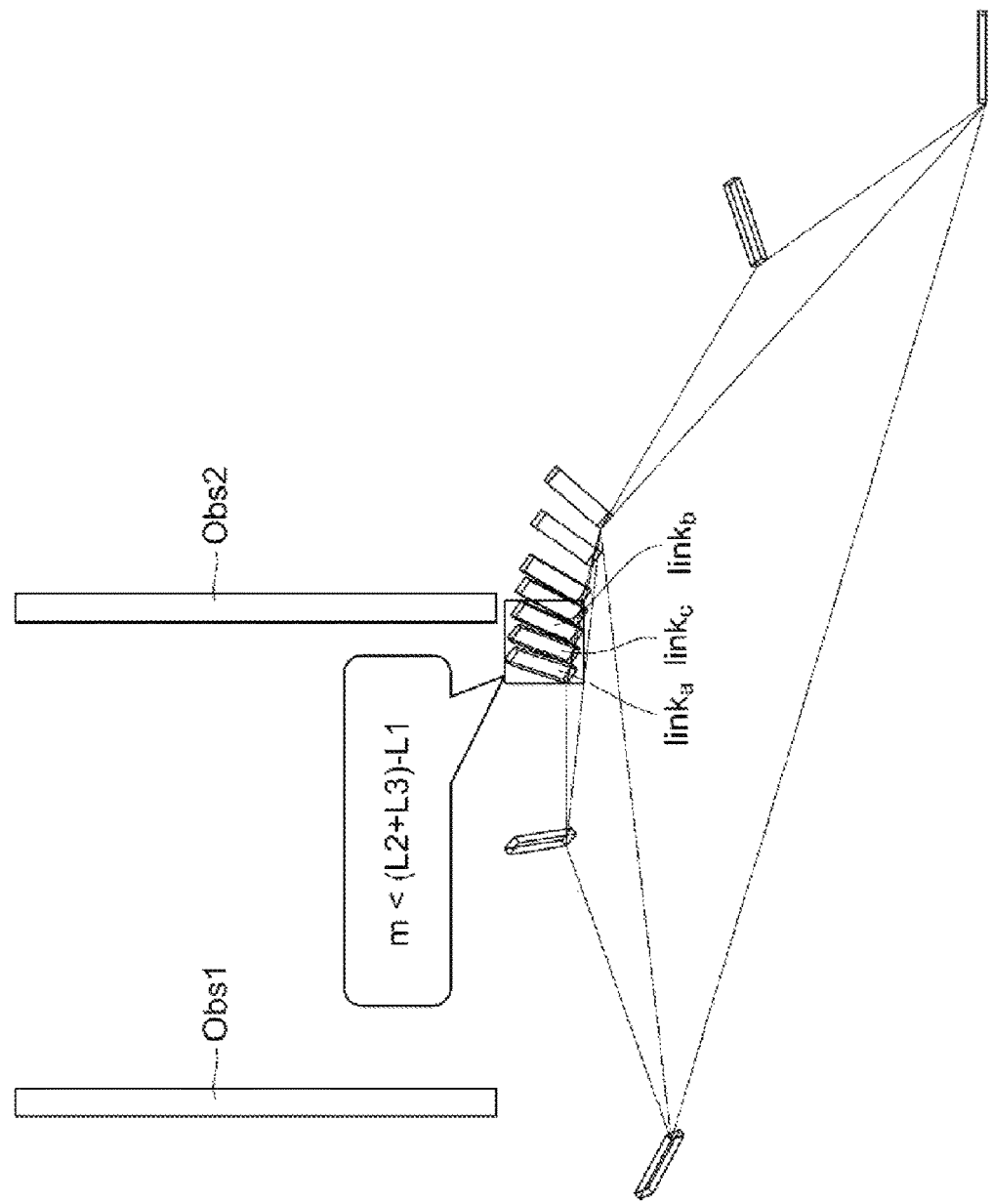
FIG. 18 is a diagram illustrating another sixth combined approximated body and nearby object approximated bodies.

FIG. 18 shows a sixth combined approximated body, which is configured by setting link$_a$ and link$_c$ in FIG. 16 as link$_a$ and link$_b$, respectively, generating link$_c$ corresponding to an intermediate link between the newly-set link$_a$ and link$_b$, and combining three robot approximated bodies corresponding to link$_a$, link$_b$, and link$_c$. If m<(L2+L3−L1) as shown in this diagram, the processing again proceeds to step S55. If the first condition or the second condition is satisfied similarly, the processing proceeds to step S58, link$_a$, link$_b$, link$_c$ and a nearby object corresponding to the nearby object approximated body data Obs$_i$ at this time are recorded as a determination result R, and then processing proceeds to step S59.

Figure 19:
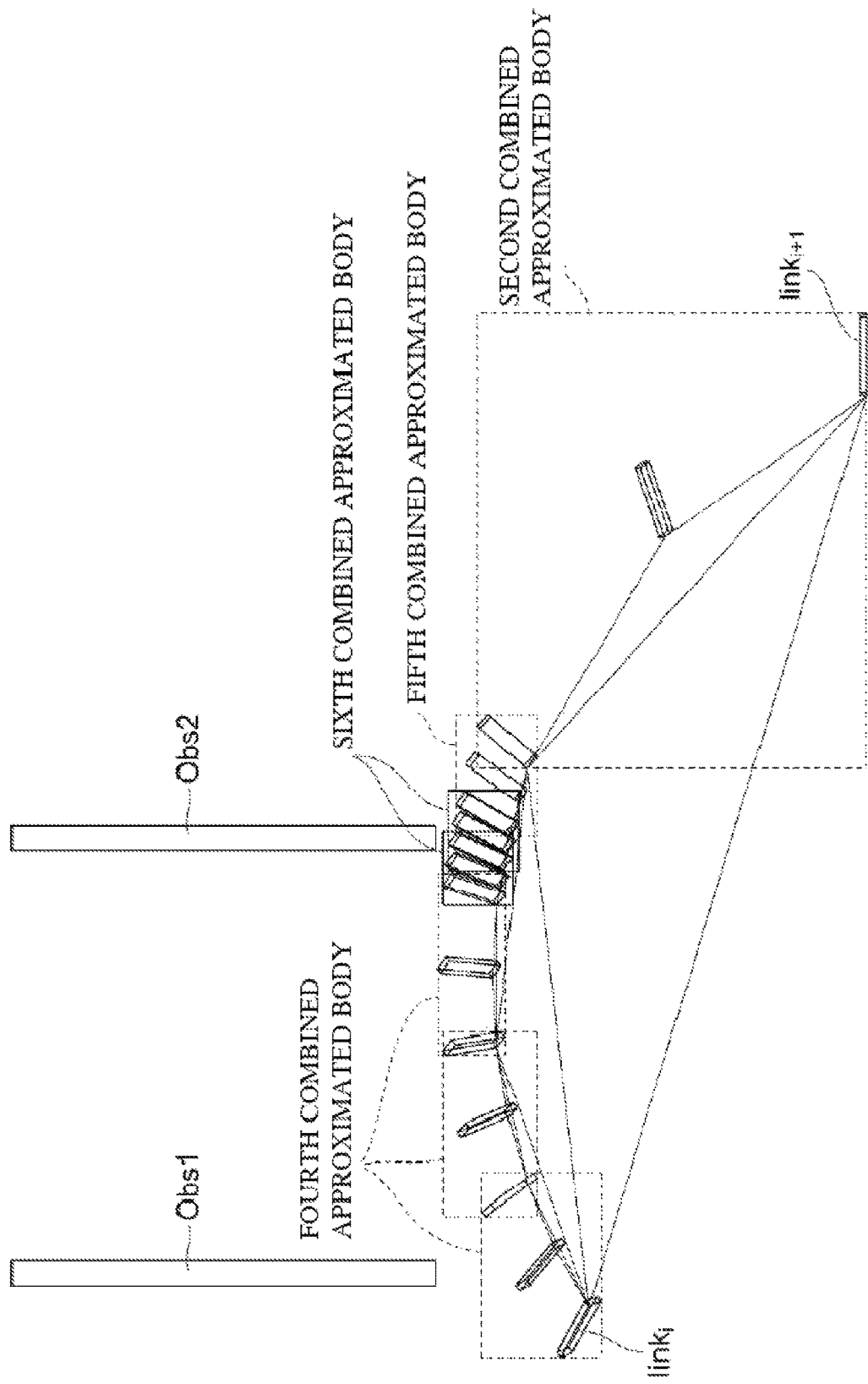
FIG. 19 is a diagram illustrating ultimately generated combined approximated bodies.

FIG. 19 shows the result of performing the above processing according to the flowchart shown in FIG. 5. As shown in this diagram, a path from link$_i$ to link$_{i+1}$ includes a portion where interference determination processing has ended with the second combined approximated body, portions where interference determination processing has ended with the fourth combined approximated bodies, a portion where interference determination processing has ended with the fifth combined approximated body, and portions where interference determination processing has ended with the sixth combined approximated bodies.

Thereafter, the flowchart shown in FIG. 5 is sequentially performed for a different link L of the robot arm 16. Note that interference determination processing illustrated in the flowchart in FIG. 5 may be performed for at least one portion of interest of the robot arm 16.

A configuration may also be employed in which, after interference determination processing illustrated in the flowchart in FIG. 5 has been performed, an orientation regarding which it is determined, according to the determination result R, that there is a possibility of interference is further subjected to computation processing to determine whether or not interference will actually occur, or computation processing to specify the position at which interference will occur, using a different interference determination method that enables more accurate interference determination.

According to the above-described interference determination method, if it is determined for a portion that there is no possibility of interference with a nearby object, further detailed interference determination is omitted for this portion. Whereas, interference determination is repeated for a portion for which it is determined that there is a possibility of interference, until a specific resolution is reached. Accordingly, it is possible to achieve both high-speed interference determination processing and detailed specification of a motion path with which there is a possibility of interference.

If, in step S54, the first combined approximated body generated or other combined approximated bodies overlap or are in contact with the nearby object approximated body data Obs$_i$, this indicates that interference will certainly occur. For this reason, the flowchart in FIG. 5 may be ended at this point in time, and a message indicating the end of processing may be output.

The approximation method is not limited to that of an embodiment, and may alternatively be a method using a polyhedron such as a convex hull, for example. As for nearby objects, an obstacle model itself that is acquired in pre-processing may be used to perform interference determination.

A configuration may also be employed in which a first (or second, or subsequent) combined approximated body that includes robot approximated bodies is generated so that the combined approximated body is separate from the robot approximated bodies by a specific distance, and then determination regarding interference with a nearby object approximated body is performed. For example, a first (or second, or subsequent) combined approximated that includes robot approximated bodies may be generated so that the combined approximated body is separate from the robot approximated bodies by a distance corresponding to the size of the combined approximated body.

The determination method in step S55 may employ various methods using different indexes, or may be omitted. For example, the necessity for subsequent interference determination processing with a higher resolution may also be determined based on the distance between adjacent orientations.

The interference determination method described in an embodiment is applicable to various robots, and can also be used for a horizontal articulated robot arm, for example.

Also, in step S54, interference determination may be performed using different methods in some specific cases. For example, there are cases where the robot arm makes a wave-like motion, rather than an arc motion, depending on the combination of joint values of the links L. For this reason, if, for example, the joint value of the leading-end link L varies significantly, it may be determined that there is a possibility of interference.

Note that, in this specification, "unit", "means", and "procedure" do not simply mean physical elements, but also includes cases where processing performed by such a "unit" or the like is realized by software. Processing to be performed by one "unit" or the like or one device may be performed by two or more physical elements or devices, and processing to be performed by two or more "units" or the like or two or more devices may be performed by one physical means or device. The above-described embodiments are examples for describing the present invention, and are not intended to limit the invention only to these embodiments.

The present invention can also be modified in various manners without departing from the gist of the invention. For example, some of the constituent elements in an embodiment can also be combined with another embodiment by a person skilled in the art exercising ordinary creativity. The order of the steps in the flowcharts can also be changed without departing from the gist of the invention.

Third Embodiment

A third embodiment will be described below with reference to the drawings. Note that the same elements are assigned the same signs, and redundant descriptions are omitted or simplified.

Figure 20:
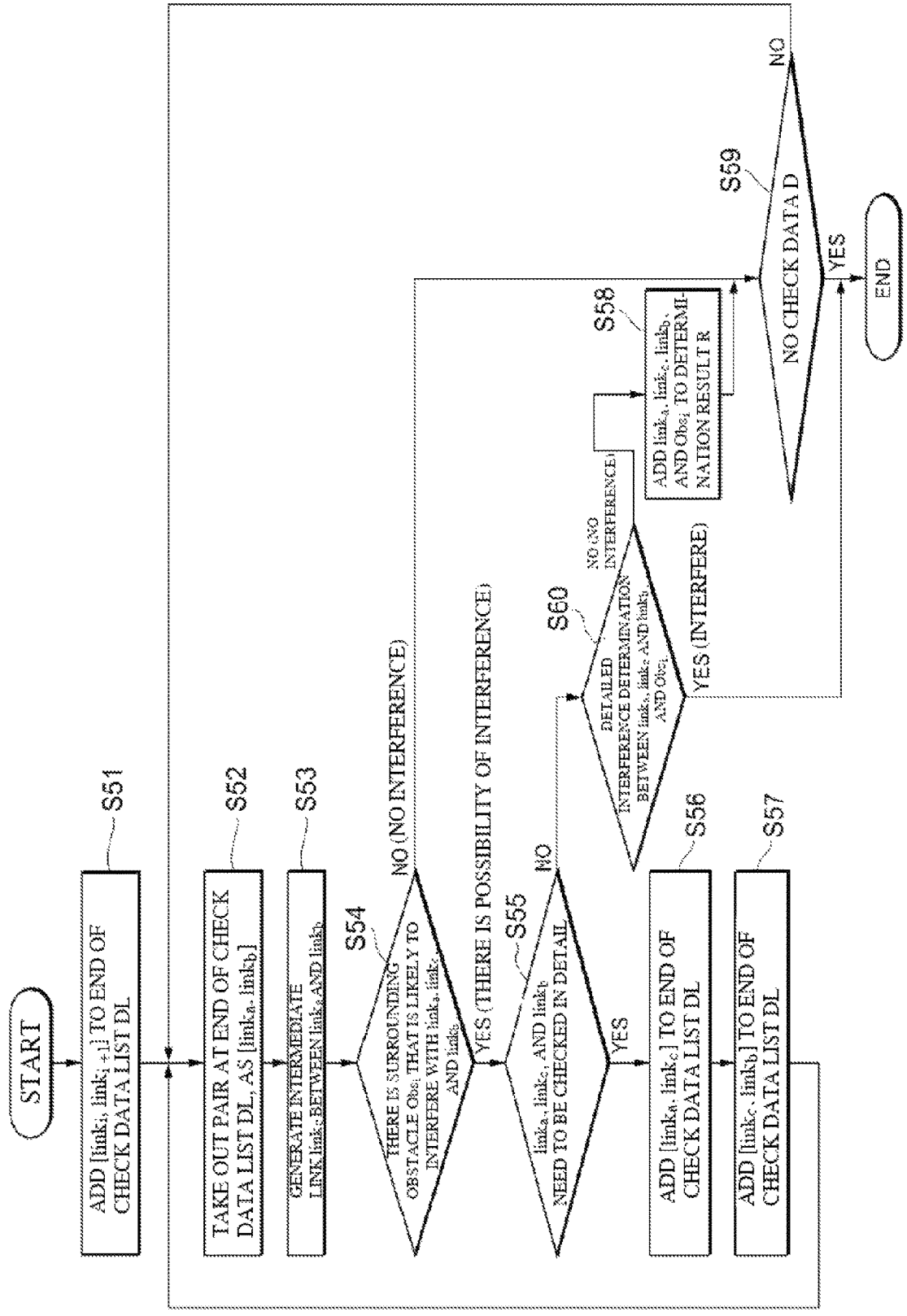
FIG. 20 is a flowchart illustrating an interference determination method according to a third embodiment.

FIG. 20 is a flowchart of an interference determination method according to a third embodiment. The interference determination method according to third embodiment differs from the interference determination method according to a second embodiment in that, after it is determined in step S55 that interference will not occur (NO), in new step S60, detailed interference determination is performed between target orientations, and the flowchart ends if it is determined that interference will occur.

More specifically, if it is determined in step S54 that there is a possibility of interference between a combined approximated body including $link_a$, $link_b$, and $link_c$ and nearby object approximated body data $Obs_i$, and it is also determined in step S55 that a sufficient resolution has already been reached (NO), determination regarding interference with the nearby object approximated body data $Obs_i$ is performed for a motion path between orientations of a specific link L that is defined by $link_a$, $link_b$, and $link_c$, using another interference determination method that enables accurate interference determination (step S60). For example, detailed interference determination is performed by generating robot approximated bodies in a plurality of intermediate orientations in an area from $link_a$ to $link_b$ with a separation width with which adjacent robot approximated bodies come into contact with each other, i.e. with which no gap is formed between adjacent robot approximated bodies, and determining whether or not interference will occur between the generated robot approximated bodies with the nearby object approximated body.

If the determination result indicates that interference will occur (YES), the flowchart ends. The result may be output to indicate that interference will occur, or may be output to specify the link L and the orientation regarding with it has been determined that interference will occur.

If it is determined that interference will not occur (NO), the processing proceeds to step S58 onward, and the same processing as that in a second embodiment is performed.

Thus, a low-speed, high-accuracy interference determination processing algorithm is prepared separately from high-speed interference determination processing according to a second embodiment, and the high-accuracy interference determination processing algorithm is applied only to a portion of a specific motion path that has been narrowed down through the high-speed interference determination processing. As a result, high-speed, high-accuracy interference determination can be realized.

Although interference determination has been performed in the order from an orientation closer to a target orientation, out of orientations set between a first orientation and a second embodiment, a configuration may alternatively be employed in which interference determination is performed in the order from an orientation closer to an initial orientation, and even if a specific resolution is reached, an orientation at the point in time when it is determined in step S60 that interference will occur is output, and subsequent interference determination processing is canceled. In this case, a configuration may also be employed in which processing is not canceled, but a new path that follows the path regarding which is has been determined that no interference will occur is searched.

The above embodiments may also be described, partially or entirely, as in the following Notes, but are not limited thereto.

(Note 1)

A method for determining, using a computing device 14 including an interface 28, a storage device 26, and a computing unit 24, a possibility that a robot arm 16 having a plurality of movable shafts interferes with a nearby object that is present near the robot arm 16, on a motion path through which the robot arm 16 moves from an initial orientation to a target orientation, wherein the computing unit 24 performs:

a step of causing the storage device 26 to store robot data obtained by approximating, using a polyhedron, a shape of a specific portion of interest of the robot arm 16;

a step of causing the storage device 26 to store data of a nearby object approximated body obtained by approximating a shape of the nearby object;

a step of acquiring, using the interface 28, the initial orientation and the target orientation;

a step of setting a first orientation of the robot arm 16 on the motion path through which the robot arm 16 moves from the initial orientation to the target orientation, a second orientation of the robot arm 16 on the motion path, the second orientation being set relatively closer to the target orientation than the first orientation, and an intermediate orientation between the first orientation and the second orientation;

a step of generating, based on the robot data, a plurality of robot approximated bodies obtained by approximating, using polyhedrons, a shape of at least one portion of interest of the robot arm 16 in the first orientation, the second orientation, and the intermediate orientation;

a step of generating a first combined approximated body configured by combining the plurality of robot approximated bodies generated in the previous step;

a step of determining whether or not the first combined approximated body interferes with the nearby object approximated body;

if it is determined in this step that interference occurs, a step of calculating an amount indicating an interval between two adjacent robot approximated bodies, of the plurality of robot approximated bodies constituting the first combined approximated body, and comparing the calculated amount with a specific value; and a step of determining whether or not to generate a combined approximated body that is smaller than the first combined approximated body, based on a result of comparing the amount indicating the interval and the specific value.

(Note 2)

A method for determining, using a computing device 14 including a computing unit 24, a possibility that a robot arm 16 having a plurality of movable shafts interferes with a nearby object that is present near the robot arm 16, on a motion path through which the robot arm 16 moves from an initial orientation to a target orientation, wherein the computing unit 24 performs:

a step of setting rotation angles of the plurality of movable shafts for specifying a first orientation of the robot arm 16 on the motion path through which the robot arm 16 moves from the initial orientation to the target orientation;

a step of setting rotation angles of the plurality of movable shafts for specifying a second orientation of the robot arm 16 on the motion path, the second orientation being closer to the target orientation than the first orientation, wherein the rotation angle of each of the movable shafts formed while the robot arm 16 is changing from the first orientation to the second orientation increases or decreases monotonously;

a step of setting information indicating rotation angles of the plurality of movable shafts to specify at least one intermediate orientation between the first orientation and the second orientation;

a step of generating a plurality of robot approximated bodies obtained by approximating, using polyhedrons, at least one portion of interest of the robot arm 16 in the first orientation, the second orientation, and the intermediate orientation;

a step of determining whether or not a first combined approximated body configured by combining the plurality of robot approximated bodies generated in the previous step interferes with the nearby object;

a step of generating, if it is determined in the previous step that interference occurs, a second combined approximated body configured by combining the plurality of robot approximated bodies, the second combined approximated body being smaller than the first combined approximated body; and a step of determining whether or not the second combined approximated body interferes with a nearby object approximated body.

(Note 3)

An interference determination system 10 for determining, using a computing device 14 including an interface 28, a storage device 26, and a computing unit 24, a possibility that a robot arm 16 having a plurality of movable shafts interferes with a nearby object that is present near the robot arm 16, on a motion path through which the robot arm 10 moves from an initial orientation to a target orientation, wherein the computing unit 24 is configured to perform:

a step of causing the storage device 26 to store robot data obtained by approximating, using a polyhedron, a shape of a specific portion of interest of the robot arm 16;

a step of causing the storage device 26 to store data of a nearby object approximated body obtained by approximating a shape of the nearby object;

a step of acquiring, using the interface 28, the initial orientation and the target orientation;

a step of setting a first orientation of the robot arm 16 on the motion path through which the robot arm 16 moves from the initial orientation to the target orientation, a second orientation of the robot arm 16 on the motion path, the second orientation being set relatively closer to the target orientation than the first orientation, and an intermediate orientation between the first orientation and the second orientation;

a step of generating, based on the robot data, a plurality of robot approximated bodies obtained by approximating, using polyhedrons, a shape of at least one portion of interest of the robot arm 16 in the first orientation, the second orientation, and the intermediate orientation;

a step of generating a first combined approximated body configured by combining the plurality of robot approximated bodies generated in the previous step;

a step of determining whether or not the first combined approximated body interferes with the nearby object approximated body;

if it is determined in this step that interference occurs, a step of calculating an amount indicating an interval between two adjacent robot approximated bodies, of the plurality of robot approximated bodies constituting the first combined approximated body, and comparing the calculated amount with a specific value; and a step of determining whether or not to generate a combined approximated body that is smaller than the first combined approximated body, based on a result of comparing the amount indicating the interval and the specific value.

(Note 4)

A program for causing a computing device 14 including an interface 28, a storage device 26, and a computing unit 24 to perform interference determination to determine a possibility that a robot arm 16 having a plurality of movable shafts interferes with a nearby object that is present near the robot arm 16, on a motion path through which the robot arm 16 moves from an initial orientation to a target orientation, wherein the computing unit 24 is caused to perform:

a step of causing the storage device 26 to store robot data obtained by approximating, using a polyhedron, a shape of a specific portion of interest of the robot arm 16;

a step of causing the storage device 26 to store data of a nearby object approximated body obtained by approximating a shape of the nearby object;

a step of acquiring, using the interface 28, the initial orientation and the target orientation;

a step of setting a first orientation of the robot arm 16 on the motion path through which the robot arm 16 moves from the initial orientation to the target orientation, a second orientation of the robot arm 16 on the motion path, the second orientation being set relatively closer to the target orientation than the first orientation, and an intermediate orientation between the first orientation and the second orientation;

a step of generating, based on the robot data, a plurality of robot approximated bodies obtained by approximating, using polyhedrons, a shape of at least one portion of interest of the robot arm 16 in the first orientation, the second orientation, and the intermediate orientation;

a step of generating a first combined approximated body configured by combining the plurality of robot approximated bodies generated in the previous step;

a step of determining whether or not the first combined approximated body interferes with the nearby object approximated body;

if it is determined in this step that interference occurs, a step of calculating an amount indicating an interval between two adjacent robot approximated bodies, of the plurality of robot approximated bodies constituting the first combined approximated body, and comparing the calculated amount with a specific value; and a step of determining whether or not to generate a combined approximated body that is smaller than the first combined approximated body, based on a result of comparing the amount indicating the interval and the specific value.

The invention claimed is:

1. An interference determination method for determining, by a processor, a possibility of interference between a robot having a plurality of movable shafts and a nearby object present near the robot, on a motion path through which the robot moves from an initial orientation to a target orientation, the method comprising:
storing, by the processor in a memory, robot data obtained by approximating, using a polyhedron, a shape of a specific portion of interest of the robot;
storing, by the processor in the memory, data of a nearby object approximated body obtained by approximating a shape of the nearby object;
acquiring, by the processor, using a communication interface, the initial orientation and the target orientation;
setting, by the processor, a first orientation of the robot on the motion path through which the robot moves from the initial orientation to the target orientation, a second orientation of the robot on the motion path, the second orientation being set relatively closer to the target orientation than the first orientation, and an intermediate orientation between the first orientation and the second orientation;
generating, by the processor based on the robot data, robot approximated bodies obtained by approximating, using polyhedrons, the shape of the portion of interest of the robot in the first orientation, the second orientation, and the intermediate orientation;
generating, by the processor, a first combined approximated body by combining the generated robot approximated bodies;
determining, by the processor, whether the first combined approximated body interferes with the nearby object approximated body;
in response to determining, by the processor, that interference occurs, calculating, by the processor, an amount indicating an interval between two adjacent robot approximated bodies, of the plurality of robot approximated bodies constituting the first combined approximated body, and comparing the calculated amount with a first value; and
determining whether to generate a second combined approximated body smaller than the first combined approximated body, based on a result of comparing the calculated amount and the first value.

2. The interference determination method according to claim 1, further comprising:
based on determining that the calculated amount is greater than or equal to the first value:
generating, by the processor, a second combined approximated body by combining at least two of the plurality of robot approximated bodies corresponding to the portion of interest in the first orientation, the second orientation, and the intermediate orientation, the second combined approximated body being smaller than the first combined approximated body; and
determining, by the processor, whether the second combined approximated body interferes with the nearby object approximated body.

3. The interference determination method according to claim 2, further comprising:
in response to determining that the second combined approximated body interferes with the nearby object approximated body, and in response to the amount indicating the interval between two adjacent robot approximated bodies, of the plurality of robot approximated bodies constituting the second combined approximated body, being greater than or equal to the first value:
generating, by the processor, an nth combined approximated body configured by combining at least two of the plurality of robot approximated bodies corresponding to the first orientation, the second orientation, and the intermediate orientation, the nth combined approximated body being smaller than a (n−1)th combined approximated body (where n is an integer of 3 or greater); and
determining, by the processor, whether the nth combined approximated body interferes with the nearby object approximated body.

4. The interference determination method according to claim 3, further comprising:
repeating generating, by the processor, the nth combined approximated body and determining whether the nth combined approximated body interferes with the nearby object approximated body, while incrementing n by 1 at a time until the amount indicating an interval between two adjacent robot approximated bodies, of the plurality of robot approximated bodies constituting the nth combined approximated body, becomes smaller than the first specific value.

5. The interference determination method according to claim 4,
wherein generating the nth combined approximated body comprises:
selecting, by the processor, two adjacent robot approximated bodies, out of the plurality of robot approximated bodies constituting the (n−1)th combined approximated body;
newly setting, by the processor, an intermediate orientation on a motion path between the two adjacent robot approximated bodies;
generating, by the processor, the robot approximated body corresponding to the newly-set intermediate orientation; and
combining, by the processor, the two adjacent robot approximated bodies with the robot approximated body corresponding to the newly-set intermediate orientation to generate the nth combined approximated body.

6. The interference determination method according to claim 1,
wherein determining, by the processor, whether a kth combined approximated body (k is an integer that is 1 or greater) interferes with the nearby object approximated body comprises:
calculating, by the processor, a distance between the kth combined approximated body and the nearby object approximated body; and
comparing, by the processor, the distance with a second specific value.

7. An interference determination method for determining, by a processor, a possibility that a robot having a plurality of movable shafts interferes with a nearby object present near the robot, on a motion path through which the robot moves from an initial orientation to a target orientation, the method comprising:
setting, by the processor, rotation angles of the plurality of movable shafts for specifying a first orientation of the robot on the motion path through which the robot moves from the initial orientation to the target orientation;
setting, by the processor, rotation angles of the plurality of movable shafts for specifying a second orientation of the robot on the motion path, the second orientation being closer to the target orientation than the first orientation, wherein the rotation angle of each of the movable shafts formed while the robot is changing from the first orientation to the second orientation increases or decreases monotonously;
setting, by the processor, information indicating rotation angles of the plurality of movable shafts to specify at least one intermediate orientation between the first orientation and the second orientation;
generating, by the processor, a plurality of robot approximated bodies obtained by approximating, using a polyhedron, at least one portion of interest of the robot, corresponding to the first orientation, the second orientation, and the intermediate orientation;
determining, by the processor, whether a first combined approximated body configured by combining the generated plurality of robot approximated bodies interferes with the nearby object;
generating, by the processor, in response to determining that interference occurs, a second combined approximated body by combining the plurality of robot approximated bodies, the second combined approximated body being smaller than the first combined approximated body; and
determining, by the processor, whether the second combined approximated body interferes with the nearby object approximated body.

8. An interference determination system comprising a computing device comprising an communication interface, a memory, and a processor configured with a program, the interference determination system for determining a possibility that a robot having a plurality of movable shafts interferes with a nearby object that is present near the robot, on a motion path through which the robot moves from an initial orientation to a target orientation,
wherein the processor is configured with the program to perform operations comprising:
storing, in the memory, robot data obtained by approximating, using a polyhedron, a shape of a specific portion of interest of the robot;
storing, in the memory, data of a nearby object approximated body obtained by approximating a shape of the nearby object;
acquiring, via the communication interface, the initial orientation and the target orientation;
setting a first orientation of the robot on the motion path through which the robot moves from the initial orientation to the target orientation, a second orientation of the robot on the motion path, the second orientation being set relatively closer to the target orientation than the first orientation, and an intermediate orientation between the first orientation and the second orientation;
generating, based on the robot data, a plurality of robot approximated bodies obtained by approximating, using polyhedrons, a shape of at least one portion of interest of the robot in the first orientation, the second orientation, and the intermediate orientation;
generating a first combined approximated body configured by combining the generated robot approximated bodies;
determining whether the first combined approximated body interferes with the nearby object approximated body;
in response to determining that interference occurs, calculating an amount indicating an interval between two adjacent robot approximated bodies, of the plurality of robot approximated bodies constituting the first combined approximated body, and comparing the calculated amount with a first value; and
determining whether to generate a combined approximated body smaller than the first combined approximated body, based on a result of comparing the calculated amount and the first value.

9. A non-transitory computer-readable recording medium storing a program for causing a computing device comprising a communication interface, a memory, and a processor to perform interference determination to determine a possibility that a robot having a plurality of movable shafts interferes with a nearby object that is present near the robot, on a motion path through which the robot moves from an initial orientation to a target orientation, the program, when read and executed by the processor, causing the processor to perform operations comprising:
storing, in the memory, robot data obtained by approximating, using a polyhedron, a shape of a specific portion of interest of the robot;
storing, in the memory, data of a nearby object approximated body obtained by approximating a shape of the nearby object;
acquiring, through the communication interface, the initial orientation and the target orientation;
setting a first orientation of the robot on the motion path through which the robot moves from the initial orientation to the target orientation, a second orientation of the robot on the motion path, the second orientation being set relatively closer to the target orientation than the first orientation, and an intermediate orientation between the first orientation and the second orientation;
generating, based on the robot data, a plurality of robot approximated bodies obtained by approximating, using polyhedrons, a shape of at least one portion of interest of the robot in the first orientation, the second orientation, and the intermediate orientation;
generating a first combined approximated body by combining the generated robot approximated bodies;

determining whether the first combined approximated body interferes with the nearby object approximated body;

in response to determining that interference occurs, calculating an amount indicating an interval between two adjacent robot approximated bodies, of the plurality of robot approximated bodies constituting the first combined approximated body, and comparing the calculated amount with a first specific value; and determining whether to generate a combined approximated body that is smaller than the first combined approximated body, based on a result of comparing the calculated amount and the first value.

* * * * *